(12) United States Patent
Matveev et al.

(10) Patent No.: US 11,195,095 B2
(45) Date of Patent: Dec. 7, 2021

(54) SYSTEM AND METHOD OF ACCELERATING EXECUTION OF A NEURAL NETWORK

(71) Applicant: Neuralmagic Inc., Somerville, MA (US)

(72) Inventors: Alexander Matveev, Cambridge, MA (US); Dan Alistarh, Meyrin (CH); Justin Kopinsky, Cambridge, MA (US); Rati Gelashvili, Cambridge, MA (US); Mark Kurtz, Medford, MA (US); Nir Shavit, Cambridge, MA (US)

(73) Assignee: NEURALMAGIC INC., Somerville, MA (US)

( * ) Notice: Subject to any disclaimer, the term of this patent is extended or adjusted under 35 U.S.C. 154(b) by 0 days.

(21) Appl. No.: 16/985,814

(22) Filed: Aug. 5, 2020

(65) Prior Publication Data

US 2021/0042624 A1 Feb. 11, 2021

Related U.S. Application Data

(60) Provisional application No. 62/884,341, filed on Aug. 8, 2019.

(51) Int. Cl.
*G06N 3/08* (2006.01)
*G06F 9/30* (2018.01)
(Continued)

(52) U.S. Cl.
CPC ........... *G06N 3/082* (2013.01); *G06F 9/5027* (2013.01); *G06F 17/16* (2013.01); *G06N 3/063* (2013.01); *G06N 20/10* (2019.01); *G06N 3/084* (2013.01)

(58) Field of Classification Search
CPC ........ G06N 3/082; G06N 20/10; G06N 3/063; G06N 3/084; G06F 9/5027; G06F 17/16
(Continued)

(56) References Cited

U.S. PATENT DOCUMENTS

| 5,577,166 A | 11/1996 | Mizuno |
| 9,558,156 B1 | 1/2017 | Bekas et al. |

(Continued)

FOREIGN PATENT DOCUMENTS

| CN | 107832839 | 3/2018 |
| EP | 3 037 980 | 6/2016 |

(Continued)

OTHER PUBLICATIONS

Deshpande, A beginner's guide to understanding convolutional neural networks, Jul. 20, 2016.
(Continued)

*Primary Examiner* — Brandon S Cole
(74) *Attorney, Agent, or Firm* — Pearl Cohen Zedek Latzer Baratz LLP

(57) ABSTRACT

A system and method of accelerating execution of a NN model, by at least one processor may include: receiving a first matrix A, representing elements of a kernel K of the NN model and a second matrix B, representing elements of an input I to kernel K; producing from matrix A, a group-sparse matrix A', comprising G tensors of elements. The number of elements in each tensor is defined by, or equal to a number of entries in each index of an input tensor register used for a specific Single Instruction Multiple Data (SIMD) tensor operation, and all elements of A' outside said G tensors are null. The system and method may further include executing kernel K on input I, by performing at least one computation
(Continued)

of the SIMD tensor operation, having as operands elements of a tensor of the G tensors and corresponding elements of the B matrix.

20 Claims, 12 Drawing Sheets

(51) Int. Cl.
  *G06F 16/24* (2019.01)
  *G06N 3/063* (2006.01)
  *G06F 17/16* (2006.01)
  *G06F 9/50* (2006.01)
  *G06N 20/10* (2019.01)

(58) Field of Classification Search
  USPC .................................................. 706/1–62
  See application file for complete search history.

(56) References Cited

U.S. PATENT DOCUMENTS

| | | | |
|---|---|---|---|
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1* | 5/2011 | Cadambi ............... G06N 20/10 712/27 |
| 2013/0138589 | A1 | 5/2013 | Yu et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0032487 | A1* | 2/2017 | Ashari ...................... G06T 1/20 |
| 2017/0103313 | A1 | 4/2017 | Ross et al. |
| 2017/0103317 | A1 | 4/2017 | Young |
| 2017/0132496 | A1* | 5/2017 | Shoaib ..................... G06K 9/66 |
| 2017/0169567 | A1* | 6/2017 | Chefd'hotel .......... G06T 7/0012 |
| 2017/0193361 | A1* | 7/2017 | Chilimbi ................ G06N 3/084 |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0189234 | A1* | 7/2018 | Nurvitadhi .......... G06F 9/30036 |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1* | 11/2018 | Kadav .................. G06K 9/6217 |
| 2019/0042250 | A1 | 2/2019 | Anders et al. |
| 2019/0042253 | A1* | 2/2019 | Eyole .................. G06F 9/30109 |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0370071 | A1 | 5/2019 | Matveev et al. |
| 2019/0179818 | A1* | 6/2019 | Lee ............................ G06F 7/14 |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370644 | A1 | 12/2019 | Kenney et al. |
| 2020/0034710 | A1 | 1/2020 | Sidhu et al. |
| 2020/0097826 | A1* | 3/2020 | Du ........................ G06N 3/0454 |
| 2020/0104717 | A1 | 4/2020 | Alistarh |
| 2020/0160181 | A1* | 5/2020 | Zlateski ............... G06K 9/6271 |
| 2020/0160182 | A1* | 5/2020 | Matveev .............. G06N 3/0454 |
| 2020/0193274 | A1 | 6/2020 | Darvish Rouhani et al. |
| 2020/0218978 | A1* | 7/2020 | Kopinsky ................ G06N 3/08 |
| 2020/0342301 | A1* | 10/2020 | Miao ..................... G06F 17/153 |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy of High-Performance Deep Learning Convolutions on SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17,Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GiMMiK-Generating bespoke matrix multiplication kernels for accelerators: Application to high-order Computational Fluid Dynamics", Computer Physics Communications, vol. 202, 2016, pp. 12-22.

(56) References Cited

OTHER PUBLICATIONS

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz et al., "Inducing and Exploiting Activation Sparsity for Fast Neural Network Inference." Proceedings of the International Conference on Machine Learning, 2020.

Lim, Robert, "Methods for Accelerating Machine Learning in High Performance Computing." University of Oregon—AREA—Jan. 2019.

Li et al. "A CPU-based Algorithm for Traffic Optimization Based on Sparse Convolutional Neural Networks." 2017, IEEE $30^{th}$ Canadian Conference on Electrical and Computer Engineering (CCECE).

Liu et al., "Sparse Convolutional Neural Networks." CVPR 2015— Computer Vision Foundation—IEEE.

Mostafa et al., "Parameter Efficient Training of Deep Convolutional Neural Networks by Dynamic Sparse Reparameterization." Proceedings of the $36^{th}$ International Conference on Machine Learning, Long Beach, California, PMLR 97, 2019.

Nisa et al., "Sampled Dense Matrix Multiplication for High-Performance Machine Learning.", 2018, IEEE $25^{th}$ International Conference on High Performance Computing (Hi PC).

Yang et al., "Deephoyer: Learning sparser neural network with differentiable scale-invariant sparsity measures.", 2019, arXiv preprint arXiv: 1908.09979.

\* cited by examiner

Matrix B (e.g., representing input 20)

Group-sparse matrix A (e.g., representing kernel element 12')

Group-sparse matrix A (e.g., representing kernel element 12')

| | | | | | | | |
|---|---|---|---|---|---|---|---|
| A 1,1 | A 1,2 | | | | | | |
| | | | | | | | |
| | | A 3,2 | A 3,3 | | | | |
| | | | A 4,3 | A 4,4 | | | |
| | | | | | A 2,5 | A 2,6 | |
| | | | | | A 6,5 | A 5,6 | A 5,7 |
| | | | A 7,3 | A 7,4 | | | |
| | | | | | | | |

521C

Matrix B (e.g., representing input 20)

| B 1,1 | B 1,2 | B 1,3 | B 1,4 | ... | | | B 1,16 |
|---|---|---|---|---|---|---|---|
| B 2,1 | B 2,2 | B 2,3 | B 2,4 | ... | | | B 2,16 |
| B 3,1 | B 3,2 | B 3,3 | B 3,4 | ... | | | B 3,16 |
| B 4,1 | B 4,2 | B 4,3 | B 4,4 | ... | | | B 4,16 |
| ... | | | | | | | |
| B 8,1 | B 8,2 | B 8,3 | B 8,4 | ... | | | B 8,16 |

FIG. 6A

SYSTEM AND METHOD OF ACCELERATING EXECUTION OF A NEURAL NETWORK

RELATED APPLICATION DATA

The present application claims priority from provisional U.S. Patent Application 62/884,341, filed on Aug. 8, 2019, and entitled "GROUPED PRUNING METHOD FOR EFFICIENT EXECUTION OF NEURAL NETWORKS WITH PRUNING AND QUANTIZATION", the contents of which is incorporated herein by reference in its entirety.

FIELD OF THE INVENTION

The present invention relates generally to the field of parallel computing systems. More specifically, the present invention relates to systems and methods for executing neural networks.

BACKGROUND

Artificial Neural Networks (ANNs) have been shown to be extremely effective at solving several real-world tasks, such as image classification, speech recognition and synthesis and reinforcement learning. At the same time, modern ANN models are notoriously intensive in aspects of computing resources, memory space, and energy consumption, requiring powerful and often specialized computer hardware to train and evaluate. For instance, ResNet50, a standard model for image classification, has in the order of 26 million parameters, and requires 4 billion floating point operations to evaluate a single image, on standard parameter settings.

The quest for efficient execution of ANNs has led to two directions of research in this area. One such direction of research has been to provide efficient hardware support for ANN execution. This has come in many forms, including for example, Graphics Processing Units (GPUs) that are customized to perform fast neural network computation; specialized hardware such as Google's Tensor Processing Units (TPUs); and specialized instruction sets, such as Intel's Vectorized Neural Network Instructions (VNNI) which aim to provide additional hardware support for fast neural network computation on standard Central Processing Units (CPUs).

Another direction of research has been to come up with ways of compressing ANN models without losing accuracy. Two ways of accomplishing such compression include: (a) pruning, or reduction of the number of connections (or in some implementations the number of active entries in a kernel used to produce the output of a NN layer) in a NN; and (b) quantization, or reduction of the floating point or other precision at which the weights and activations or other values in a neural network are expressed (e.g., to lower the standard 64 or 32 bits per number to represent the same number using, e.g. 8 bits). To this end, several model compression schemes have been proposed to reduce the size of currently available ANN models by up to an order of magnitude, while at the same time speeding up inference.

While currently available systems and methods may provide efficient hardware execution for each one of these methods in isolation, it is currently impossible to exploit the benefits of both pruning and quantization in conjunction on existing computer hardware, particularly on commodity CPUs. This is because there is currently no efficient hardware support for ANNs which are both quantized and pruned. In fact, the existing hardware instructions for vectorized execution of instructions on CPUs, such as the VNNI instructions by Intel, make it difficult to use them efficiently on sparse computations.

In addition, and as known in the art, NN execution may require extensive calculations, including for example calculations of matrix multiplication. Modern computing devices may support vectoral or vector instructions, that may be adapted to simultaneously address a plurality of operands. Vectoral or vector instructions may receive as input, at least one vector including a plurality of elements, and may operate on the plurality of elements within the scope of a single instruction (e.g., without having to perform multiple operand fetch cycles). Currently available systems for execution of NN models may employ one or more vectoral instructions, such as vectoral fused multiply accumulate (FMA) instructions or vectoral multiply and accumulate (MAC) instructions, to improve the efficiency of matrix multiplication, and thus also improve the efficiency NN execution.

However, as elaborated herein, currently available systems for execution of NNs may not take into account specific aspects of modern vectoral instruction sets, such as the Intel AVX512 VNNI instruction set. Accordingly, currently available systems for execution of NNs may not be adapted to optimally utilize modern instruction sets for the full benefit of boosting execution of NNs.

SUMMARY

As elaborated herein, embodiments of the disclosed subject matter may employ instruction sets such as specialized vectoral or vector instruction sets (e.g., the Intel VNNI instruction set) to provide efficient support for computation over quantized (e.g., low-precision) weight and activation values, by allowing vectorized instructions to be performed efficiently over sets of quantized, pruned operands. In other words, embodiments may: (a) create a synergy between two processes of data compression, namely pruning of operands on one hand and quantization of operands on the other; (b) tailor the pruning and quantization according to parameters of specialized vectoral instructions, such as FMA instructions or vectoral MAC instructions of the VNNI instruction set; and (c) employ the specialized vectoral instruction of the vectoral instruction sets on the compressed data, to fully exploit the benefits of compression, as elaborated herein.

Embodiments of the disclosed subject matter may include a method of accelerating execution of a NN model, by at least one processor. Embodiments of the method may include, for example, receiving at least one parameter of a vectoral operation; receiving a first matrix A, representing elements of a kernel K of the NN model and a second matrix B, representing elements of an input I to kernel K; producing from matrix A, a group-sparse matrix A', may include G arrays of elements, wherein dimensions of the G arrays may be defined by the at least one parameter of the vectoral operation, and wherein all elements of A' outside said G arrays may be null; and executing kernel K on input I, by performing at least one computation of the vectoral operation, having as operands elements of an array of the G arrays and corresponding elements of the B matrix.

According to some embodiments, said at least one parameter may include a first number $N1>1$, representing a number of indices of one or more input vector registers, and a second number $N2>1$, representing a number of entries in each of the N1 indices. Producing of group-sparse matrix A' may include pruning matrix A, such that A' may include G arrays or groups of N2 NN elements. The arrays or groups of N2 NN elements may be consecutive along one or more axes of A'.

The term group-sparse may be used herein in relation to a matrix or tensor, to indicate that the matrix may be: (a) sparse, e.g., have or include a plurality of zero or null values; and (b) include groups, arrays or tensors of NN elements that may be non-zero.

The vectoral or vector operation may, for example, be a fused multiply accumulate (FMA) operation, and executing kernel K on input I may include performing at least one FMA computation between N2 elements of an array of the G arrays and corresponding elements of the B matrix.

According to some embodiments, performing at least one FMA computation may include: (a) selecting a first array of the G arrays; (b) broadcasting the N2 elements of the selected array into respective N2 entries of each of the N1 indices of a first input vector register; (c) populating N1*N2 entries of a second input vector register with N1*N2 elements of matrix B; (d) performing multiplication between elements stored in respective entries of the first input vector register and the second input vector register; and (e) accumulating the result of said multiplications in corresponding N1 indices of a first output vector register.

According to some embodiments, accumulating the result of said multiplications in corresponding N1 indices of a first output vector register may be performed such that each index N of the first output vector register may include a sum of N2 multiplications between entries in the N'th index of the first input vector register and entries in the N'th index of the second input vector register.

According to some embodiments, said at least one parameter may include a first number M1 pertaining to a first dimension of the vectoral or vector operation, and one or more second number M2, pertaining to at least one second dimension of the vectoral operation. The G arrays may be multidimensional arrays or tensors, that may include M1 elements along a first indexed axis (e.g., a row) of matrix A' and M2 elements along respective one or more second indexed axes (e.g., a column) of matrix A'.

According to some embodiments, the G arrays may be one-dimensional vectors along a first indexed axis, selected from a row and a column of matrix A', and wherein the at least one FMA computation may be performed between N2 elements of an array of the G arrays and corresponding elements in a second indexed axis, selected from a column and a row of matrix B.

According to some embodiments, populating N1*N2 entries of the second input vector register may include, for example, storing N2 elements pertaining to a second indexed axis of matrix B in respective entries of an index of an input vector register; and repeating said storage with a subsequent second indexed axis of matrix B and with a subsequent index of the input vector register, until N1*N2 elements may be stored in the input vector register.

According to some embodiments, said steps (b) (e.g., broadcasting the N2 elements) through (e) (e.g., accumulating the result of said multiplications in corresponding N1 indices of the first output vector register) may be repeated, with a second, subsequent array of the G arrays. This repetition may proceed until all G arrays of A' are traversed.

According to some embodiments, if the second array resides or is stored in the same first indexed axis (e.g., the same row) as the first array, then embodiments of the invention may accumulate multiplications pertaining to the second array into indices of the first output vector register. Additionally, the second array does not reside in the same first indexed axis (e.g., the same row) as the first array, then embodiments of the invention may accumulate multiplications pertaining to the second array into indices of a second output vector register.

According to some embodiments of the invention, pruning matrix A to receive matrix A' may include, for example, pruning elements of kernel K, so as to obtain G arrays of N2 consecutive elements; retraining pruned kernel K based on at least one instance of input I; and repeating pruning and retraining steps iteratively, so as to diminish G, until a target sparsification ratio may be achieved in pruned kernel K.

Additionally, embodiments of the invention may calculate a saliency value for each array of G; select one or more arrays of G, corresponding to, or having the lowest saliency values; and set values of elements of the selected one or more arrays to null. The saliency value may, for example be a norm, such as an L1 norm or an L2 norm. Other types of saliency values may also be used Embodiments of the disclosed subject matter may include a system for accelerating execution of a NN model. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: receive at least one parameter of a vectoral operation; receive a first matrix A, representing elements of a kernel K of the NN model and a second matrix B, representing elements of an input I to kernel K; produce from matrix A, a group-sparse matrix A', may include G arrays of elements, wherein dimensions of the G arrays may be defined by the at least one parameter of the vectoral operation, and wherein all elements of A' outside said G arrays may be null; and execute kernel K on input I, by performing at least one computation of the vectoral operation, having as operands elements of an array of the G arrays and corresponding elements of the B matrix.

Embodiments of the disclosed subject matter may include a method of accelerating execution of a NN model, by at least one processor. Embodiments of the invention may include: receiving a first matrix A, representing elements of a kernel K of the NN model and a second matrix B, representing elements of an input I to kernel K; producing from matrix A, a group-sparse matrix A', may include G tensors of elements, wherein all elements of A' outside said G tensors may be null; and executing kernel K on input I, by performing at least one computation of a Single Instruction Multiple Data (SIMD) tensor operation, having as operands elements of a tensor of the G tensors and corresponding elements of the B matrix. The number of elements in each tensor may be defined by, or equal to the number of entries in each index of an input tensor register used in the hardware SIMD tensor operation. The SIMD tensor operation may be, for example, an AVX512 VNNI vectoral operation or instruction.

BRIEF DESCRIPTION OF THE DRAWINGS

The subject matter herein is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a schematic diagram, depicting an example calculation of a vector MAC operation;

FIGS. 5A, 5B and 5C are schematic diagrams, jointly depicting an example of a method of accelerating execution of NNs, according to some embodiments of the invention;

FIGS. 6A and 6B are schematic diagrams, jointly depicting another example of a method of accelerating execution of NNs, according to some embodiments of the invention;

DETAILED DESCRIPTION

Figure 1:
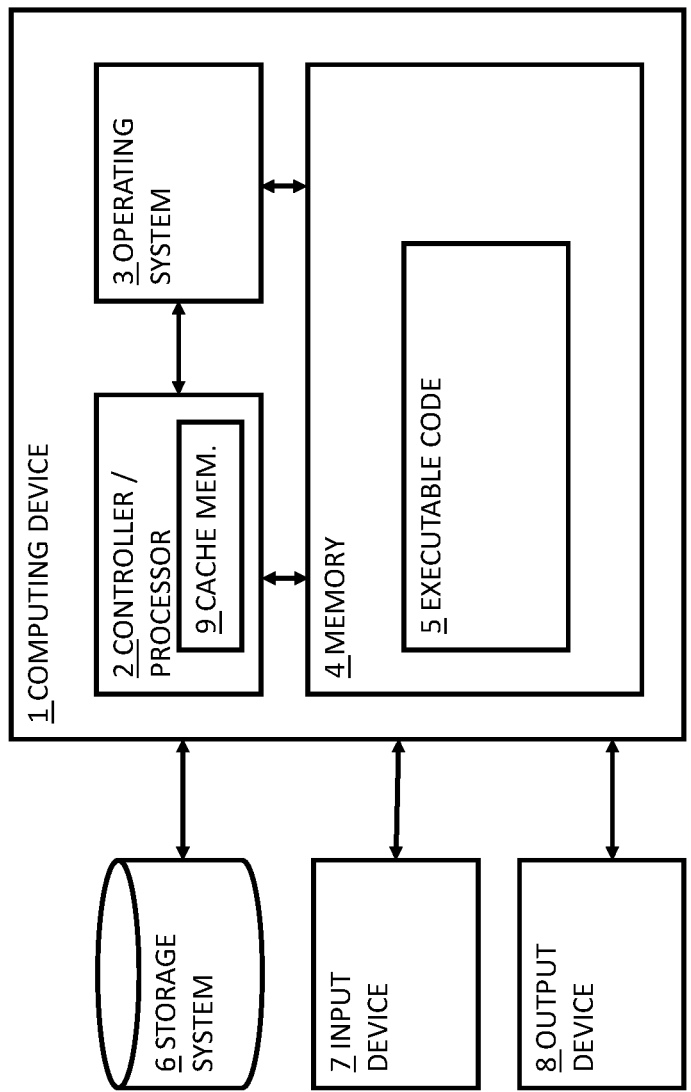
FIG. 1 is a block diagram, depicting a computing device, which may be included within an embodiment of a system for executing neural networks using pruning and/or quantization, according to some embodiments of the invention.

One skilled in the art will realize the disclosed subject matter may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the disclosed subject matter may be practiced without these specific details. In other instances, well-known methods, procedures, and components have not been described in detail so as not to obscure the disclosed subject matter. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

A neural network (NN), artificial neural network (ANN), used herein interchangeably, may refer to computing systems that may be inspired by biological computing systems, but operating using manufactured digital computing technology. NNs are made up of computing units typically called neurons (which are artificial neurons, as opposed to biological neurons) communicating with each other via connections, links or edges. NN neurons are typically arranged in layers. In common NN implementations, the signal at the link between artificial neurons can be for example a real number, and the output of each neuron can be computed by function of the (typically weighted) sum of its inputs, such as a rectified linear unit (ReLU) function. NN links or edges typically have a weight that may be adjusted as learning proceeds. The weight increases or decreases the strength of the signal at a connection.

NNs are typically modelled (e.g., mathematically, as matrices) and executed on conventional or special purpose computing systems such as CPUs or graphical processing units (GPUs). Thus a NN model may be a mathematical representation of a NN, e.g. using matrices and other structures, stored as data for example in a computer memory.

Typically, NN neurons are divided or arranged into layers or NN layers, where different layers may be adapted to perform different kinds of transformations on their inputs and can have different patterns of connections with other layers.

A convolutional layer may refer to a layer of a NN that may apply an operation (e.g., a convolution operation) on one or more input data elements (e.g., neurons of an input layer) of the NN, so as to extracted a feature that may be included in the one or more input data elements. For example, the input to an input layer may include a Red, Green and Blue (RGB) representation of an image, and a convolutional layer may be adapted to extract a feature of the represented image, such as edges included in the image.

A NN filter may refer herein to a portion of a convolutional layer that may be adapted to apply a convolution function on incoming input data so as to extract at least one feature of the incoming input data. A NN filter may be implemented as, or may include one or more NN kernels, which may apply different aspects of filtering. Using the example of the RGB image, a NN layer such as a convolutional layer may include a first filter adapted to extract a first feature of the represented image (e.g., edges included in the image) and a second filter, adapted to extract a second feature of the RGB image. Each of said filters may include a plurality (e.g., three) two-dimensional (2D) kernels, each adapted to collaborate with, or be applied to a single channel (e.g., the R, G or B channel) of the input layer.

The terms "elements" or "NN elements" may refer herein to numerical elements that may be included in components (e.g., layers, kernels, etc.) of a NN, including for example kernel elements, layer elements and the like. As known in the art, components of NNs may be represented as matrices. For example, layers, filters and/or kernels of the NN may be represented by multidimensional matrices or tensors. In this condition, one or more (e.g., each) numerical elements of such a matrix may be referred to as NN elements of the respective layer, filter and/or kernel, and may be assigned a weight value.

A "kernel tensor" or "kernel matrix" may refer to a multidimensional data structure, that may include a plurality of NN elements pertaining to a respective kernel. Using the example of the image processing model, a corresponding kernel tensor may include a plurality of dimensions, such as a first spatial position of the 2D kernels (e.g., an X dimension), a second spatial position of the 2D kernels (e.g., a Y dimension), an index of the kernels (hereinafter a "kernel index", in this example from 1 to 3) and an index of the filters (hereinafter a "filter index", in this example from 1 to 2).

A "batch" may refer to a capacity of embodiments of the disclosed subject matter to facilitate handling (e.g., applying filters) of a plurality of input data elements in a substantially simultaneous manner Pertaining to the same example of the image processing model, a batch value of 2 may indicate that embodiments of the invention may be adapted to execute at least one filter on two incoming image data elements, substantially simultaneously. A corresponding kernel tensor data structure may thus have an additional index which may be referred to as a "batch index", corresponding to the batch dimension of the input data (in this example from 1 to 2).

"Array" or "element array" may refer to a block or group of contiguous elements of a NN kernel matrix or tensor. According to some embodiments the dimensions of element arrays may be set according to predetermined (e.g., received) definitions or parameters of a vector or vectoral instruction, to facilitate efficient execution of the vectoral instruction on input data.

The term "group sparse" may refer herein to a configuration of a matrix (e.g., a kernel matrix) that may include one or more element arrays, each including a group of contiguous NN elements, and where all other NN elements of the matrix are set to null (e.g., a zero value).

The term nullification may be used herein in relation to one or more NN elements to describe an assignment of a value (e.g., a zero value or any form of label) to indicate that the relevant one or more NN elements do not contribute to a specific calculation (e.g., training and/or inference) of the NN.

For example, embodiments may receive a first version of an NN model, including a first version of at least one kernel. The first version of the kernel may be dense, as commonly referred to in the art, to indicate that it may have a large portion or ratio of non-zero elements, relative to its overall number of elements. Embodiments of the invention may nullify one or more elements (e.g., a block of elements) of the first version of the kernel, to produce a second version of the kernel, in which the one or more nullified elements are assigned a null weight value.

The term "pruning" may describe creating one or more nullified elements of the NN, to indicate deletion, setting to zero, "skipping" or omission of the one or more nullified elements from the specific calculation (e.g., training and/or inference) of the NN. Pertaining to the same example, embodiments of the invention may prune the one or more nullified elements (e.g., the block of elements) of the kernel, in a sense that embodiments may omit the one or more nullified elements from execution (e.g., training, inferring, etc.) of the NN.

The term "Quantization" may describe a process or action of diminishing a representation (e.g., in bits) of an NN element or of a weight of an NN element, or lowering the resolution of the number or the number of bits used to represent the number. For example, embodiments may perform quantization of one or more NN elements included in an element array, according to specific parameters of a given instruction set.

The terms vectoral or vector instruction and vectoral or vector operation may be used interchangeably to refer to instructions for a processing unit (e.g., a CPU) that may simultaneously address a plurality of operands. Vector or vectoral instructions or operations may receive as input, at least one vector that may include a plurality of elements, stored on an input vector register. Vectoral instructions may operate on the plurality of elements of the input vector register within the scope of a single instruction (e.g., without having to perform multiple operand fetch cycles). An example for a vectoral instruction may be a vectoral multiplication instruction, in which elements of two input vector registers are respectively dot-multiplied, as commonly referred to in the art, to produce a vector of respective product results. The vector of output results may be stored in an output vector register. A vectoral instruction set may include a group or set of vectoral instructions, that may be defined, for example, by a specific hardware or processor vendor. An example for a vectoral instruction set may be the Intel VNNI instruction set.

The term indexed axis may be used herein to refer to a specific location of a elements in a matrix (e.g., a kernel matrix). For example, in a 2D kernel matrix, a first indexed axis may be a specific row of NN elements, and a second indexed axis may be a specific column of NN elements.

Reference is now made to FIG. 1, which is a block diagram depicting a computing device, which may be included within an embodiment of a system for accelerating executing of NNs, according to some embodiments.

Computing device 1 may include a controller or processor 2 that may be, for example, a central processing unit (CPU) processor, a chip or any suitable computing or computational device, an operating system 3, a memory 4, executable code 5, a storage system 6, input devices 7, output devices 8 and cache memory 9. Processor or controller 2 (or one or more controllers or processors, possibly across multiple units or devices) may be configured to carry out methods described herein, and/or to execute or act as the various modules, units, etc. E.g. computing device 1 may act as a NN, or train or create a NN. More than one computing device 1 may be included in, and one or more computing devices 1 may act as the components of, a system according to embodiments of the invention. Embodiments of the disclosed subject matter may be executed by one or more systems such as in FIG. 1; e.g. elements of FIG. 3 may include components of FIG. 1.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Controller or processor element 2 may be a multicore processor, e.g. a CPU or GPU, e.g. one chip including a number of cores, each capable of executing a processing thread at the same time other cores in the controller or processor 2 are executing another, possibly different, threat. Controller or processor 2 may include, or may be associated with one or more cache memory elements 9. In some embodiments, some cache elements 9 may be local or private to a specific core, and other caches may be shared by all cores on a controller or processing unit 2.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. Processor or controller 2 may be configured to carry out embodiments of the disclosed subject matter by executing executable code 5, which may be stored on a non-transitory storage medium such as memory 4, storage system 6, or another storage system. For example, executable code 5 may be an application that may execute neural networks using pruning and/or quantization, as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit.

Data pertaining to one or more NN models may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

The one or more cache memory elements 9 may be or may include for example, a cache layer 1 (CL1) module, a cache layer 2 (CL2) module and/or a cache layer 3 (e.g., CL3) cache memory module, as known in the art. Cache memory 9 may include, for example, an instruction cache memory space and/or a data cache memory space, and may be configured to cooperate with one or more processors (such as element 2) and/or one or more processing cores to execute at least one method according to embodiments of the disclosed subject matter. Cache memory 9 may typically be implemented on the same die or chip as controller or processor 2 and may thus be characterized by a memory bandwidth that may be higher than that of memory 4 and storage system 6.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

As elaborated herein, embodiments of the invention may include a semi-structured pruning method, which may prune or nullify NN elements in one or more kernels of the NN in a pattern that may be specifically designed to be compatible with quantized vectorized operations such as vector or vectoral operations of the VNNI instruction set. In some embodiments pruning may be performed with the aim of a certain instruction and/or a specific target processor, on which the NN is to be executed (e.g., inferred or trained).

Thus, embodiments of the invention may include a process of compression of a NN model, that may include two stages or phases. In a semi-structured pruning phase, embodiments of the invention may prepare the network for quantization by pruning one or more elements of the NN model following a specific quantization-friendly pattern. In a subsequent quantization stage or phase, the precision of the underlying weights is lowered. Both these steps are carefully applied to minimize the loss of accuracy in the neural network.

It may be appreciated that embodiments of the invention may be applied to a plurality of NN layer types and ANN architectures. However, for the purpose of simplicity, the description herein will focus on Convolutional Neural Networks (CNNs) and convolutional layers. It may be appreciated by a person skilled in the art that embodiments of the disclosed subject matter may be modified so as to support other ANN architectures such as fully-connected layers or recurrent layers, as known in the art.

As known in the art, a CNN may include a sequence of convolutional, pooling, and fully-connected layers, each of which may apply a non-linear transformation to its input.

Figure 2:
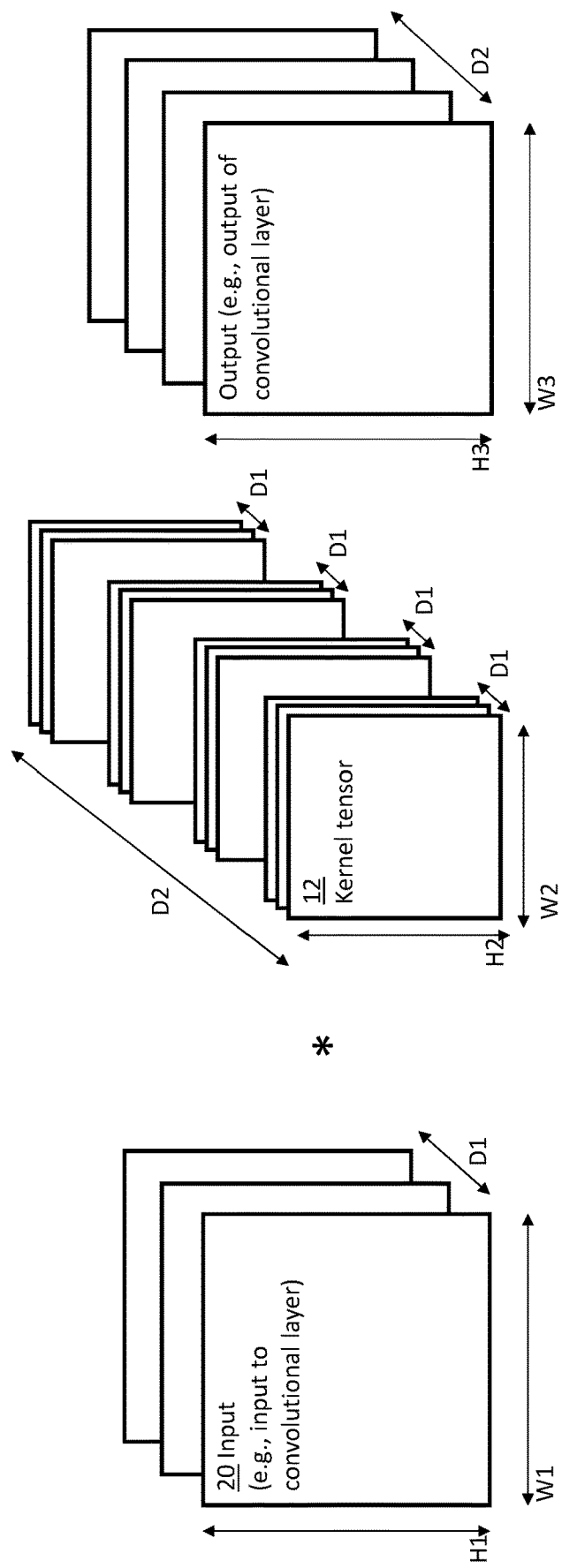
FIG. 2 is a schematic diagram, depicting a non-limiting example of a convolutional layer of a convolutional neural network.

Reference is now made to FIG. 2, which is a schematic diagram, depicting a non-limiting example of a convolutional layer of a CNN. The key role of a CNN may be played by convolutional layers, such as the one depicted in the non-limiting example of FIG. 2. In this example, the input of a convolutional layer may be structured as a set of D1 (in this example, three) channels, each of which is represented as a 2D data structure. For example, the input to the convolution layer may be or may include a data structure such as an image, and each channel of the D1 channels may correspond to a single channel (e.g., R, G and B) of the input image 20. In the example of FIG. 2, each channel may be represented as a 2D data structure, having a first spatial dimension (e.g., height H1) and a second spatial dimension (e.g., width W1).

Input 20 may be processed via a set of kernels or filters, represented herein by a multidimensional kernel tensor 12. In the example of FIG. 2, kernel tensor 12 includes D2 (in this example, four) filters, each having D1 (in this example, three) kernels, one for each input channel. In the example of FIG. 2, each kernel (in this example, D1*D2=12) of kernel tensor 12 may have two spatial dimensions, e.g., width W2 and height H2. Thus tensor column may be characterized by a data structure that may have at least four dimensions: a width spatial dimension (e.g., indexed by a width index w, $1 =< w =< W2$); a height spatial dimension (e.g., indexed by a height index h, $1 =< h =< H2$); a kernel dimension (e.g., indexed by a kernel index KI, $1 =< KI =< D1$); and a filter dimension (e.g., indexed by a filter index FI, $1 =< FI =< D2$).

According to some embodiments, the application of filters may be done as per the following example. For each input channel (in this example, three), each kernel is applied to each of a number of spatial positions of the corresponding channel, multiplying every entry in the kernel with every entry in the input, and summing the result. The results across the D1 kernels are then summed. The result of this summation may undergo an activation function, and finally result in a corresponding output element in one of the D2 output planes (corresponding to each filter). Iterating the above procedure for each possible location in the input and each kernel in the layer may generate the entire output of the convolutional layer.

As known in the art, a neural network can be described by having its weights and inputs represented as matrices, and the computation of the network represented as a sequence of multiplications of these matrices. Thus, developing fast matrix multiplication algorithms is key to the performance of neural networks. It is also important to consider properties of these matrices that can enable fast matrix multiplication algorithms. One such property is sparsity. A matrix may be said to be sparse if it contains a large portion of entries that are nullified, or have zero value. During matrix multiplication, if the computations related to the zero elements are never performed, then the overall computation may be reduced if one could branch accordingly: execute the multiplication if the matrix entry is non-zero, or do nothing if it is zero. In some embodiments, the avoidance of performing operations on zero elements may be achieved in a manner other than branching, such as compilation which does not include instructions for zero elements.

This observation, coupled with the high computational cost of executing deep neural networks, inspired various methods of reducing computational cost, by exploiting the fact that many of the connections or weights in the neural network kernels can be safely nullified without adversely (e.g., beyond a predefined threshold) affecting the accuracy of the neural network.

Currently available systems for executing NNs (e.g., CNNs) may apply one of two types of pruning processes for NN (e.g., CNN) kernels:

A first type of pruning process, that may be performed by currently available systems, may include structured pruning. In this condition, the pruning process may attempt to eliminate complete components of the NN, including for example entire filters, from the neural network. This type of pruning process may have the benefit that the resulting computational savings may be easy to materialize: since entire filters may be eliminated, all the corresponding multiplications may be skipped. Practically, one may obtain a "slim" NN with a substantially equivalent or equal level of accuracy. On the other hand, empirical studies show that the number of structure units (e.g., filters) which may be safely eliminated before significant accuracy loss occurs is quite low (e.g., in the 20-40% of filters for most neural networks).

A second type of pruning process that may be performed by currently available systems, may include unstructured pruning. In this condition, the pruning process may attempt to eliminate individual matrix entries, such as NN kernel weights (e.g., representing connections of the NN), without enforcing any particular structure. The resulting sparse model may be harder to leverage for fast computation in comparison to that of the structured pruning process. However, considerably higher sparsity ratios can be obtained in this way.

Embodiments of the disclosed subject matter may employ a third type of pruning process, that may: (a) integrate the advantages of both structured and unstructured pruning processes, and (b) may prune kernels of the NN so as to optimize execution of NN layers on input data, using a predefined vector instruction set, as elaborated herein.

Embodiments of the disclosed subject matter may nullify weights of a NN, so as to make at least one portion of the NN sparse following a predefined pattern. According to some embodiments, the predefined pattern may be set so as to comply with, or accommodate one or more parameters of an architecture of a computing device (e.g., element 1 of FIG. 1) that may execute the NN, as elaborated herein. Additionally, or alternatively, the predefined pattern may set so as to comply with, or accommodate one or more parameters of at least one vector or vectoral instruction that may be employed during execution of the NN, as elaborated herein.

Figure 3:
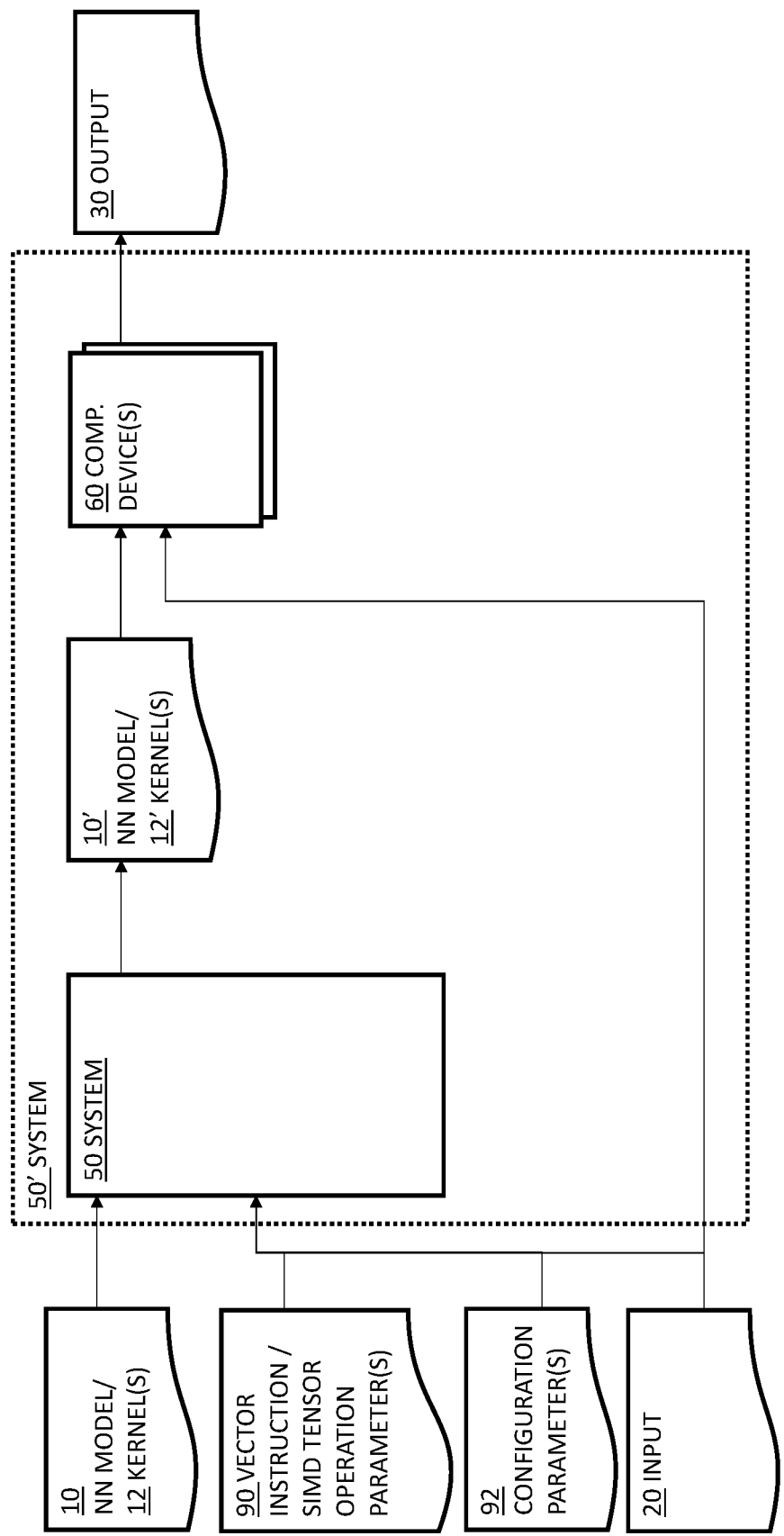
FIG. 3 is a block diagram, depicting a system for accelerating executing of NNs, according to some embodiments of the disclosed subject matter.

Reference is now made to FIG. 3, which depicts a system 50 for accelerating executing of NNs according to some embodiments of the invention. System 50 may be implemented as a software module, a hardware module or any combination thereof. For example, system 50 may be or may include a computing device such as element 1 of FIG. 1, and may be adapted to execute one or more modules of executable code (e.g., element 5 of FIG. 1) to accelerate execution of NNs, as further described herein.

Additionally, or alternatively, a system for accelerating execution of NNs may be implemented on, or executed by, a plurality of computing devices. Such embodiments are marked in FIG. 3 as system 50'. For example, a first computing device (e.g., element 1 of FIG. 1) may implement a first portion of a system for accelerating execution of NNs (e.g., marked 50), and may be communicatively connected (e.g., via a computer network, such as the internet) to a second computing device 60 (e.g., element 1 of FIG. 1), that may implement a second portion of a system for accelerating execution of NNs.

According to some embodiments, system 50 may be adapted to receive at least one portion of a first NN model 10 (e.g., a first version of an NN model 10). NN model 10 may represent a NN and may include one or more kernel data elements 12. Kernel data elements 12 may for example be represented matrices or tensors, and may be referred to herein as kernel matrices 12.

As elaborated herein, system 50 may be configured to produce, from the at least one kernel matrix 12, a second version of kernel matrix 12, which may be referred to herein as kernel matrix 12'. For example, kernel matrix 12' may be a group-pruned version of kernel matrix 12.

According to some embodiments, system 50 may produce a second version of NN model 10, that may be referred to herein as NN model 10'. NN model 10' may include one or more kernel data elements 12'.

System 50 may propagate NN model 10' (e.g., the second version of NN model 10) to computing device 60, to be executed there. For example, computing device 60 may be adapted to execute the second version of NN model 10 on one or more input data instances 20.

The term "execute" may refer herein to computations that may be applied to the NN model, including for example training the NN model (e.g., in a training stage, as known in the art) and/or applying or inferring the trained model to at least one input data element 20 (e.g., in an inference stage, as known in the art). Executing a NN model may thus be functionally equivalent to executing the NN represented by the NN model.

Alternatively, system 50 may include at least one element of computing device 60, and may thus be adapted to receive a first version of NN model 10, produce therefrom a second NN model 10' (e.g., a second version of NN model 10), and execute the second version of the NN model 10' on incoming data 20.

As elaborated herein, embodiments of the invention may be adapted to modify one or more kernels of an NN according to at least one parameter or definition of a vector or vectoral operation or instruction 90, so as to optimally utilize the vectoral operation for the full benefit of boosting execution of NN model 10.

As known in the art, an NN may include a sequence of kernels, each including a plurality of NN elements, and each such NN element may be assigned a weight. In pruned NNs, some kernels may be considered sparse, in a sense that a predefined portions of the weight values are set to null (e.g., zero). For example, a 90% sparse NN convolution layer may have 90% of its weights equal to zero. As a result, a sequence of weight values that are stored continuously in a computer's memory (e.g., elements 4, 6 or 9 of FIG. 1) will have some locations that are zero and some that are not. It may therefore be appreciated by a person skilled in the art that simply loading these values into a vector register by using a vectorized load function or a broadcast function as commonly referred to in the art will introduce useless values into the vector register.

According to some embodiments, system 50 may include a preprocessing module 510, adapted to "pack" the non-zero values together, while preserving the original indices of the non-zero values, so that their original locations could later be reproduced. For example, preprocessing module 510 may apply a Compressed Sparse Row (CSR) algorithm, as known in the art, to compress at least one sparse portions of a kernel 12 and pack the compressed data in at least on input vector register.

At this point, it may seem that it may be possible to load the packed non-zero values into a vector register and use them, as they are to perform matrix multiplication. However, the non-zero elements of kernel matrix 12 must be multiplied by respective values of input matrix 20, that are located at the original indices of the non-zero kernel elements. Such an operation may require performance of a vector gather instruction, to fetch values from various places in memory (e.g., from storage of matrix 20) and aggregate the fetched values into one input vector register. As known in the art, Gather/Scatter instructions are forbiddingly expensive in terms of timing and computing resources, and should therefore be avoided for efficiency. Therefore, it may be appreciated by a person skilled in the art that it may not possible to pack non-zero weight values and load them into an input vector register as they are.

As a result, embodiments of the invention may take a different approach to vectorization of pruned NNs. According to some embodiments, a single non-zero NN element weight value (e.g., a scalar included in matrix 12) may be multiplied by a sequence of input values (e.g., values included in input matrix 20) that may be continuous in memory. The result may then be aggregated into a sequence of distinct output vector registers, that may also be continuous in memory.

Figure 4:
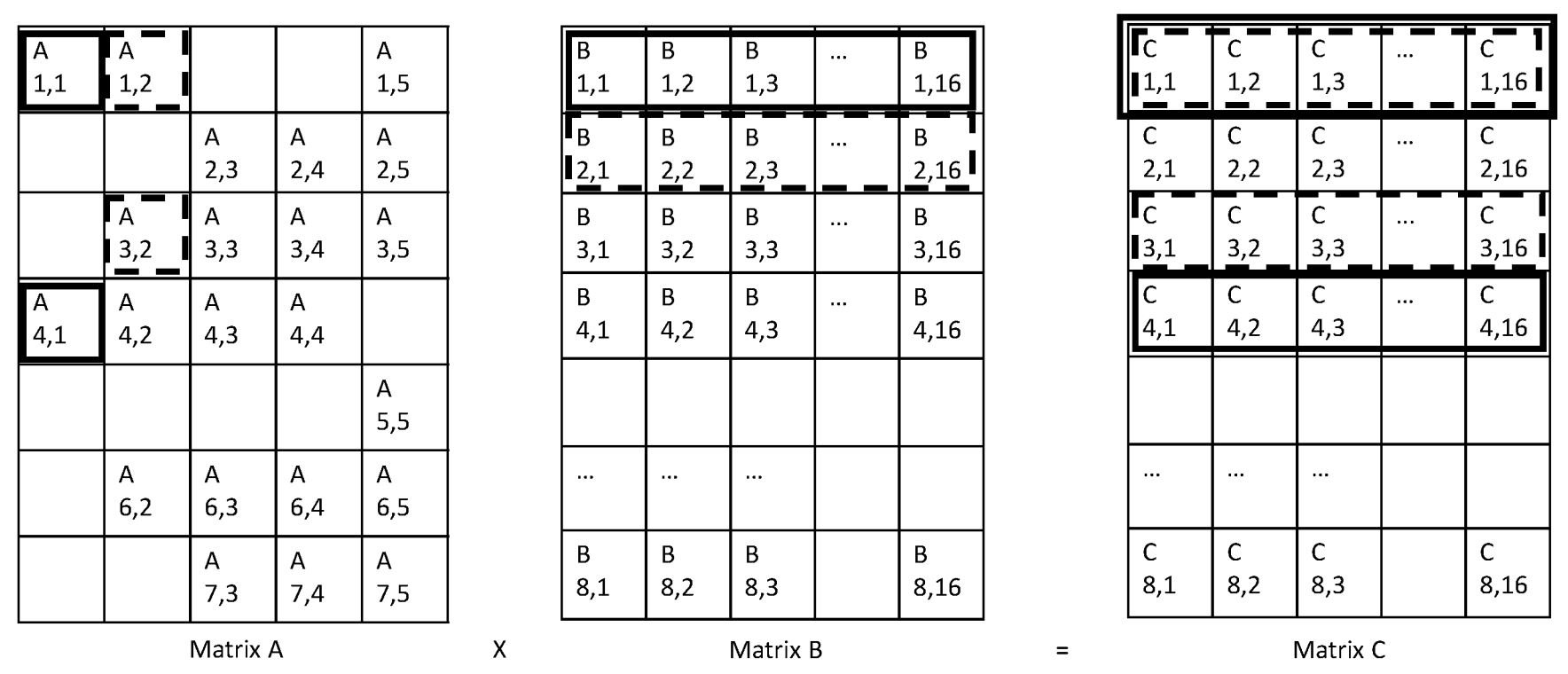

Reference is now made to FIG. 4, which is a schematic diagram, depicting an example of calculation of a vector multiplication and accumulation (e.g., a MAC or FMA) operation, between elements of a first, sparse matrix A and a second matrix B. For example, matrix A may be a sparse kernel matrix 12', that may represent a kernel 12' of NN 10, and may include a plurality of NN elements, and matrix B may represent a matrix of data elements 20 that may serve as input (e.g. "input I") to kernel 12'.

The process of multiplication may be an iterative one, in which every iteration may include traversal of an index of matrix A. In the example of FIG. 4, each iteration may relate to a specific column of matrix A. It may be appreciated that additional forms of traversing through the input matrices may also be possible.

In the example depicted by FIG. 4, in a first iteration (e.g., marked by consecutive rectangular frames), two values of matrix A (e.g., A1,1 and A4,1) may be multiplied by the same vector (e.g., B1,1 through B1,16) in row number 1 of matrix B. The products of these vector or vectoral multiplication operations may be added into rows 1 and 4 in matrix C respectively, where each row of C may represent a separate pre-allocated output vector register.

In the next iteration (e.g., marked by broken rectangular frames), two values of matrix A (e.g., A1,2 and A3,2) may be multiplied by the same vector (e.g., B2,1 through B2,16) in row number 2 of matrix B. The products of these vectoral multiplication operations may be added into rows 1 and 3 in matrix C, respectively. Again, each row of C may represent a separate pre-allocated output vector register.

It may be appreciated that there may be good parallelism between the FMAs in the separate loop iterations as they read from the same value of B but accumulate (e.g., write) into separate registers in C. However, this is not true among the FMAs in the first and second loop iterations. For example, the vectoral products of NN elements A1,1 and A4,1 are both accumulated into the same row in C (e.g., into the same output vector register). Therefore, the operation of accumulating the vector products of NN elements A1,1 and A4,1 conflict, and must be executed one after the other. Embodiments of the invention may include an improvement over currently available systems for NN execution, by utilizing properties of vectoral operations pertaining to modern vectoral instruction sets, such as the Intel AVX512 VNNI instruction set, and thus execute these multiplications in parallel.

Figure 5B:
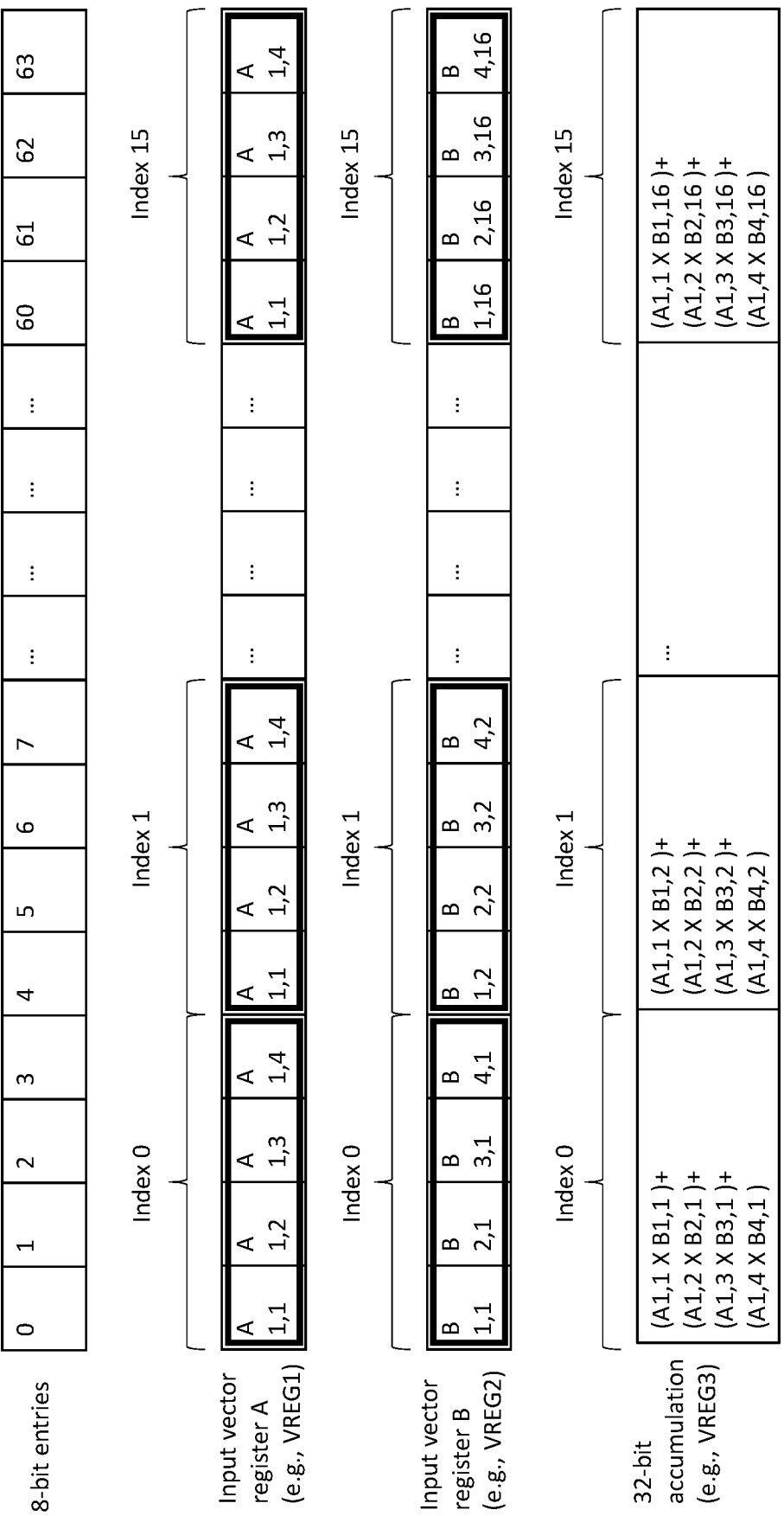
Figure 5C:
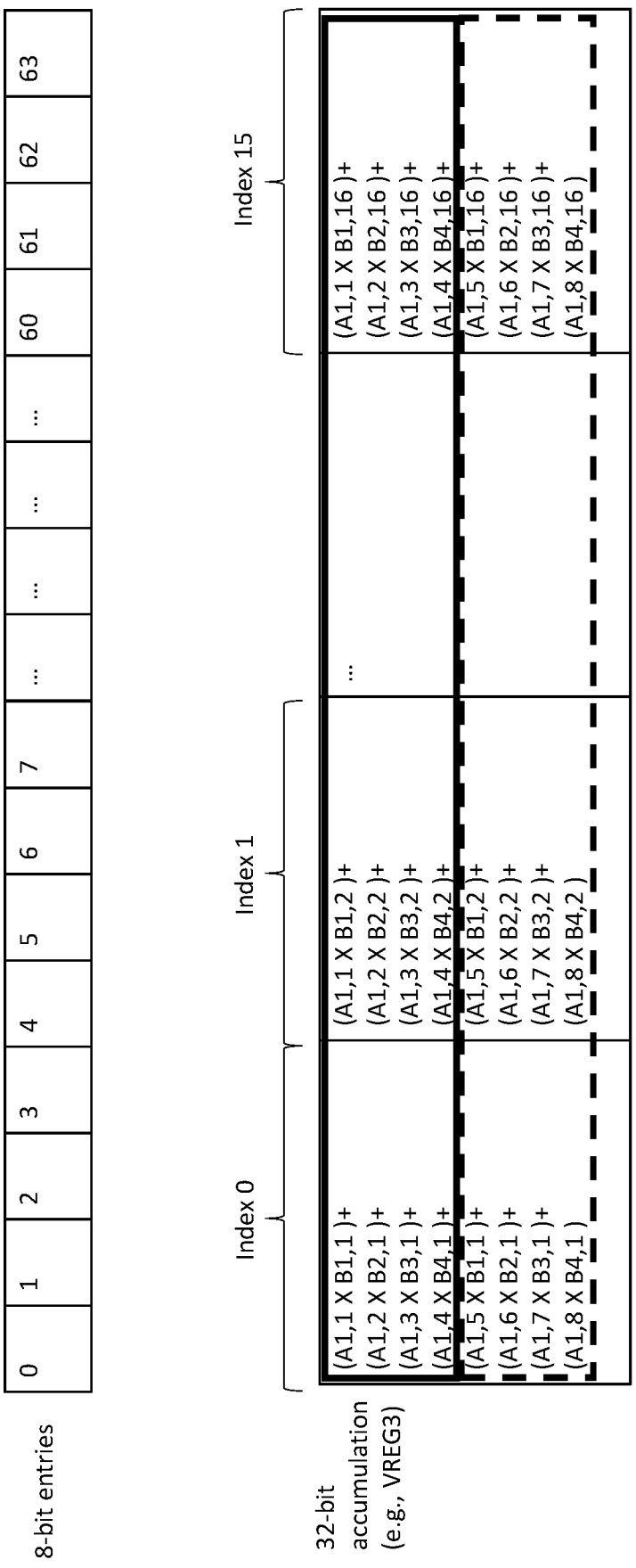

Reference is now made to FIGS. 5A, 5B and 5C, which are schematic diagrams, jointly depicting an example of a method of accelerating execution of NNs, according to some embodiments of the invention.

FIG. 5A depicts a first matrix A, that may be a group-sparse representation of a kernel (e.g., element 12' of FIG. 3) of the sparse version 10' of NN model 10. As shown in FIG. 5A, matrix A may include a plurality of arrays 521C of NN elements. Some arrays 521C are marked in the example of FIG. 5A by rectangular frames. As elaborated in the explanation that follows, dimensions of arrays 521C may be defined by the at least one parameter of a specific vectoral operation 90. In other words, the shape and size of arrays 521C may be custom-made to match specific characteristics or properties of vectoral instruction 90 such as an FMA instruction, as elaborated herein. FIG. 5A further depicts an example of a second matrix B, that may be, or may represent an input (e.g., element 20 of FIG. 3) to the kernel A.

FIG. 5B depicts a first iteration of an FMA operation, having as operands: (a) NN elements of arrays 521C of matrix A (e.g., of the group-pruned kernel 12') and (b) corresponding elements of input matrix B. As shown in FIG. 5B, the products of the first iteration are stored in an output register.

FIG. 5C depicts a second, subsequent iteration of an FMA operation, having as operands: (a) subsequent NN elements of arrays 521C of matrix A (e.g., of the group-pruned kernel 12'), (b) corresponding elements of input matrix B. As shown in FIG. 5B, the products of the second iteration are accumulated with the products of the first iteration in the respective output register.

The following discussion relates to the non-limiting example of the vectoral VPDPBUSD FMA instruction of the Intel AVX512 VNNI vectoral instruction set for 8-bits, to demonstrate functionality of methods of the disclosed subject matter. However, it should be appreciated by a person skilled in the art that embodiments of the invention may be adapted to employ different vectoral instructions, pertaining to different vectoral instruction sets.

As shown in FIG. 5B, the 8-bit VPDPBUSD FMA instruction of the Intel AVX512 VNNI instruction set may perform a dot product of 4 consecutive 8-bit values from VREG1 with 4 consecutive 8-bit values from VREG2, and store the result into a 32 bit accumulator in VREG3.

However, as demonstrated herein (e.g., in relation to FIG. 4), such a dot product may not enable efficient vectorizing of pruned NNs, which requires that: (a) a single weight value scalar (e.g., a single NN element in matrix A) should be multiplied by a sequence of input values (e.g., a sequence of NN element in matrix B) and (b) the products should be aggregated into a sequence of distinct vectoral output registers. In that sense, VNNI instructions were not designed for handling unstructured pruned kernel NNs. However, as shown herein, embodiments of the invention may enable efficient execution of NNs by (a) performing VNNI-friendly semi-structure kernel pruning, that may prune matrix A in consecutive groups or arrays of 4 8-bit elements, and (b) performing 4 FMA operations (for each of the 4 NN kernel elements), in a substantially concurrent manner.

As known in the art, AVX512 VNNI operations enable vectorization of 512 bits of data into 64×8 bit integer values. The VPDPBUSD VNNI FMA instructions may allow dot-multiplying 4 8-bit values in a first 32 bit input vector register (e.g., VREG1) by 4 8-bit values in each of 16 32-bit words of a 512-bit VNNI FMA input vector register, and accumulation of all 4 products into a corresponding 32 bit word, of the 16 words in an output VNNI FMA vector register.

In other words, embodiments of the invention may receive at least one parameter of a vectoral operation 90, and prune kernel 12 to produce a group-pruned version (e.g., 12') of kernel 12, according to the properties of the VNNI instruction 90.

For example, as depicted in the example of FIGS. 5A-5C, at least one parameter 90 may be a first number N1>1 (e.g., 16), representing a number of indices of one or more input vector registers, at least one parameter 90 may be a second number N2>1, representing a number of entries (e.g., 4) in each of the N1 (e.g., 16) indices. Embodiments of the invention may prune a kernel matrix 12, so as to produce a group-sparse kernel matrix 12' (e.g., matrix A of FIG. 5A). Group-sparse kernel matrix 12' (e.g., matrix A) may include a plurality of groups or arrays 521C, each including N2 (e.g., 4) consecutive elements.

The N2 elements may be consecutive along one or more axes of A. As shown in the non-limiting example of FIG. 5A, arrays 521C may be one-dimensional (1D) arrays, and the N2 elements may be consecutive along rows of A. It may be appreciated that in another non-limiting example, the N2 elements may be consecutive along columns of A. In another non-limiting example, arrays 521C may be two-dimensional (2D) arrays, and the N2 elements may be consecutive along rows and columns of A (e.g., so as to form a rectangular array).

In yet another non-limiting example, arrays 521C may be multidimensional arrays (e.g., 3D arrays), and the N2 elements may be consecutive along a plurality of dimensions of A (e.g., so as to form a multidimensional cube). For example, the at least one vector instruction parameter 90 may include a first number M (e.g., M1) pertaining to a first dimension (e.g., a length, a width, a depth or another dimension) of vectoral operation 90, and one or more second number M (e.g., M2), pertaining to at least one second dimension (e.g., a length, a width, a depth or another dimension) of the vectoral operation 90, such that the product of all M numbers (e.g., M1*M2, etc.) may be equal to N2. Accordingly, embodiments of the invention may perform group-pruning of matrix 12, such that the plurality of arrays 521C of matrix 12' may be multidimensional arrays or tensors, including M1 elements along a first indexed axis (e.g., a row, a column, etc., as elaborated in Table 1) of matrix A, and M2 elements along corresponding one or more second indexed axes (e.g., rows, columns, etc.) of matrix A.

Embodiments of the disclosed subject matter may execute kernel 12 on input 20 by performing at least one FMA computation between N2 elements of an array 521C of group-pruned kernel matrix 12' (e.g., matrix A of FIG. 5A) and corresponding elements of a matrix (e.g., matrix B of FIG. 5A) representing NN elements of input 20.

As shown by the non-limiting example of the 8-bit VNNI FMA instruction 90, depicted in FIGS. 5A and 5B, in a first iteration of vectoral instruction 90, the same N2 (e.g., 4) consecutive NN elements of array 521C (e.g., NN elements A1,1-A1,4) are each applied across 4 rows of matrix B, and accumulated to produce 16 32-bit values in output vector register (e.g., VREG3), as elaborated herein.

According to some embodiments, in a first iteration of FMA instruction 90, embodiments of the invention may select a first array 521C of the plurality of arrays of kernel matrix 12'. For example, as shown in FIG. 5A, embodiments of the invention may select the array marked by a consecutive frame, and including NN elements A1,1 through A1,4.

Embodiments of the invention may broadcast, per the broadcast computer processor function known in the art which may copy one value to all entries in a vector or other data storage structure, the N2 (e.g., 4) elements of the selected array 521C into respective N2 (e.g., 4) entries of each of the N1 indices of a first input vector register. For example, as shown in FIG. 5B, elements A1,1 through A1,4 may be broadcasted into each index of input vector register VREG1.

Embodiments of the invention may populate N1*N2 entries of a second input vector register with N1*N2 elements of input matrix 20. For example, as shown in FIGS. 5A and 5B, embodiments of the invention may populate N1*N2 (e.g., 16*4=64) entries of input vector register VREG2 with respective elements of matrix B, representing elements of input data 20.

Embodiments of the invention may perform multiplication between elements stored in respective entries of the first input vector register and the second input vector register. The result of said multiplications may be accumulated (e.g. added to the previous stored results) in corresponding N1 indices of a first output vector register.

For example, as shown in FIG. 5B: (a) the value in the first entry of index 0 of input vector register VREG1 may be dot-multiplied by the value in the first entry of index 0 of input vector register VREG2; (b) said dot-multiplication may be repeated for all N2 (e.g., 4) entries of index 0; (c) the products of all multiplications of index 0 are accumulated into index 0 of output vector register VREG3; and (d) previously elaborated calculations of (a)-(c) are repeated for all indices (e.g., indices 1-15) of vector registers VREG1, VREG2 and VREG3.

In other words, each index N (e.g., $N \in \{0, 1, \ldots, (N1-1)\}$) of the first output vector register may include a sum of N2 (e.g., 4) multiplications between entries in the N'th index of the first input vector register (e.g., VREG1) and entries in the N'th index of the second input vector register (e.g., VREG2).

It may be appreciated that the group-pruning of NN elements of kernel matrix 12, according to parameters of instruction 90 (e.g., VNNI FMA instruction), resulting in group-pruned matrix 12', may enable calculations of steps (a) through (d) to be performed substantially concurrently by the vectoral FMA instruction, without requiring additional fetching of NN elements from memory (e.g., element 4 and/or 9 of FIG. 1). Thus embodiments of the invention provide an improvement of efficiency over currently available systems for executing NN models.

As shown in the non-limiting example of FIGS. 5A through 5C, arrays 521C may be one-dimensional vectors along a first indexed axis (e.g., a row of matrix A), and the FMA computation is performed between N2 elements of array 521C and corresponding elements in a second indexed axis (e.g., a column of matrix B).

It may be appreciated that additional selection of the first and second indexed axes may also be possible. For example, as known to persons skilled in the art, the order of multiplied matrices A and B may be switched, resulting in selection of arrays 521C along columns of matrix A, and multiplying the N2 kernel NN elements of arrays 521C with corresponding elements along rows of matrix B.

Embodiments of the invention may populate N1*N2 entries of input vector register VREG2 based on the selection of the second indexed axis (e.g., columns) of matrix B. For example, as shown in FIGS. 5A and 5B where the second indexed axes are columns of matrix B, embodiments of the invention may store N2 elements pertaining to a columns of matrix B in respective entries of an index of input vector register VREG2; and repeat said storage with a subsequent columns of matrix B (and subsequent, corresponding indices of the input vector register VREG2), until N1*N2 (e.g., 16*4=64) elements are stored in input vector register VREG2.

As shown in FIG. 5C, embodiments of the invention may repeat the calculation elaborated herein, with a subsequent array 521C. Embodiments may continue repeating said calculations until all arrays 521C of matrix 12' (e.g., represented by matrix A of FIG. 5A) are traversed, so as to finalize the FMA multiplication of matrices A and B. In other words, embodiments of the invention may repeat the steps of: broadcasting the N2 elements to VREG1; populating N1*N2 entries of VREG2; performing multiplication between elements stored in respective entries of VREG1 and VREG2; and accumulating the products of said multiplications in corresponding N1 indices of VREG3) with a subsequent array 521C, until all arrays 521C of matrix 12' (e.g., represented by matrix A of FIG. 5A) are traversed.

As elaborated herein (e.g., in relation to FIG. 4), and as known in the art, summation of dot-multiplication products needs to be performed into separate pre-allocated output vector registers, according to the dimensions of matrices A and B.

Embodiments of the invention may therefore accumulate dot-multiplication products pertaining to a first array 521C with dot-multiplication products pertaining to a second array 521C into the same output vector register, depending on the indexed axes (e.g., rows, columns, etc.) in matrix A, where the first array 521C and second array 521C reside or are stored.

For example, if the second array 521C resides in the same first indexed axis (e.g., row) of matrix A as the first array 521C, then embodiments of the invention may accumulate multiplication products pertaining to the first array 521C together with multiplication products pertaining to the second array 521C into indices of the same output vector register. This accumulation is demonstrated in FIG. 5C, where multiplication products pertaining to the first array 521C-1 (marked by a consecutive frame) and multiplication products pertaining to the second array 521C-2 (marked by a broken frame) are accumulated together in corresponding indices of the same output vector register VREG3.

Additionally, if the second array 521C does not correspond to, or reside or is stored in the same first indexed axis (e.g., row) of matrix A as that of the first array 521C, then embodiments of the invention may accumulate multiplication products pertaining to the first array 521C in a one output vector register, and accumulate multiplication products pertaining to the second array 521C in another output vector register.

Figure 6B:
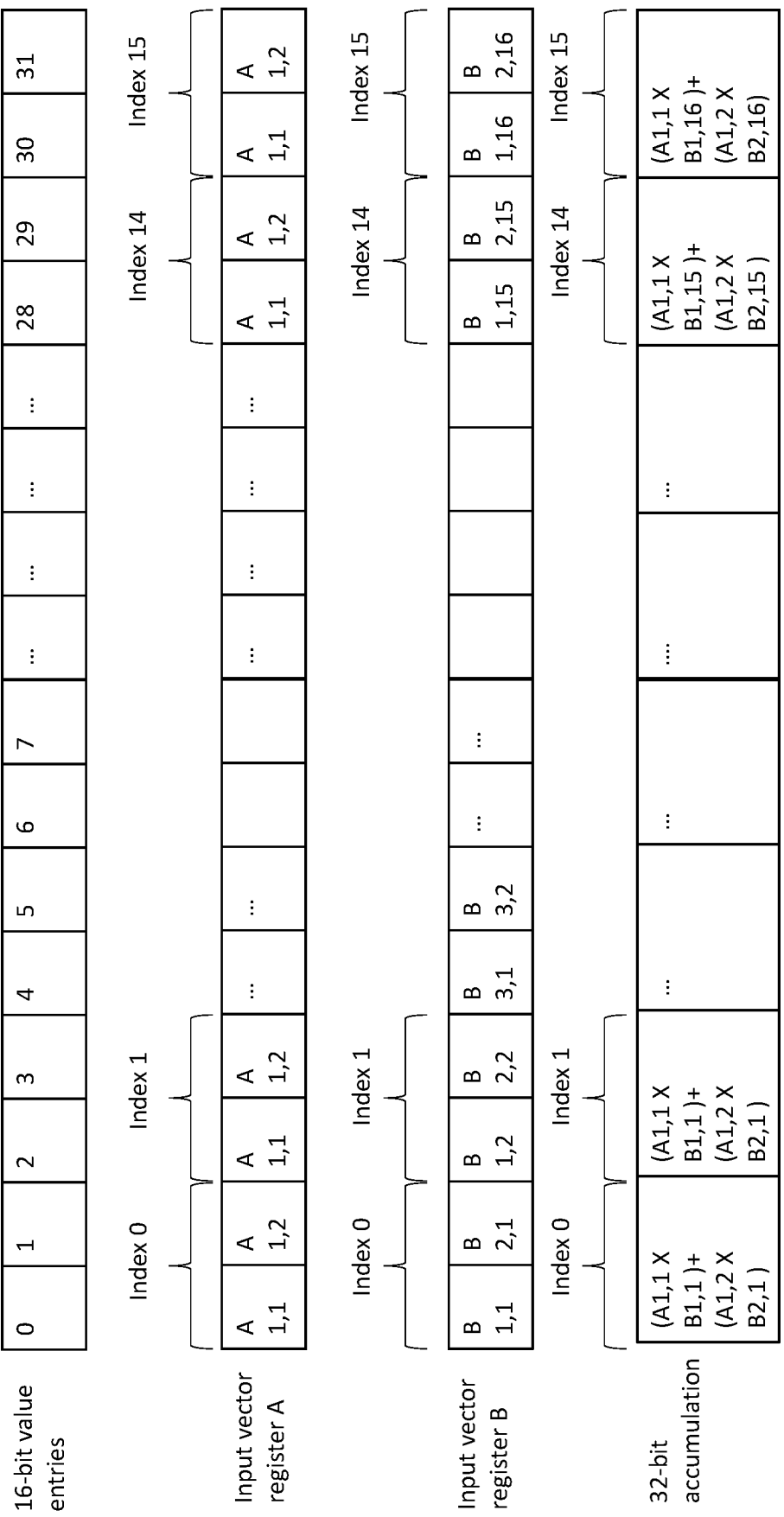

Reference is now made to FIGS. 6A and 6B, which are schematic diagrams, jointly depicting another example of a method of accelerating execution of NNs, according to some embodiments of the invention.

As elaborated herein, embodiments of the invention may group-prune NN elements of kernel matrix 12, according to parameters of instruction 90 (e.g., VNNI FMA instruction), resulting in group-pruned matrix 12'.

As elaborated herein, the 8-bits VPDPBUSD FMA instruction of the Intel AVX512 VNNI instruction set may perform a dot product of N2=4 consecutive 8-bit values from VREG1 with N2=4 consecutive 8-bit values from VREG2, and store the result into a 32 bit accumulator in VREG3. FIGS. 5A, 5B and 5C demonstrate group-pruning of kernel matrix 12 to arrays 521C of N2=4 NN elements, so as to accommodate efficient execution of 8-bits VPDPBUSD FMA instructions. In comparison, FIGS. 6A and 6B demonstrate group-pruning of kernel matrix 12 to accommodate efficient execution of a 16-bits VPDPBUSD FMA instruction of the Intel AVX512 VNNI instruction set.

As known in the art, the 16-bit VPDPBUSD FMA instruction may perform a dot product of N2=2 consecutive 16-bit values from VREG1 with N2=2 consecutive 16-bit values from VREG2, and store the result into a 32 bit accumulator in VREG3. Therefore, embodiments of the invention may group-prune elements of kernel matrix 12 to produce a group-pruned version 12' of kernel matrix 12, where matrix 12' (represented in FIG. 6A as matrix A) includes a plurality of arrays 521C, and where each array includes N2=2 consecutive NN kernel elements.

FIG. 6B depicts another example of executing a vectoral FMA instruction, using arrays 521C that include N2=2 NN elements. The example of FIG. 6B is substantially identical to the process discussed above, in relation to FIG. 5B (where N2=4), and will not be repeated here, for the purpose of brevity.

Figure 7:
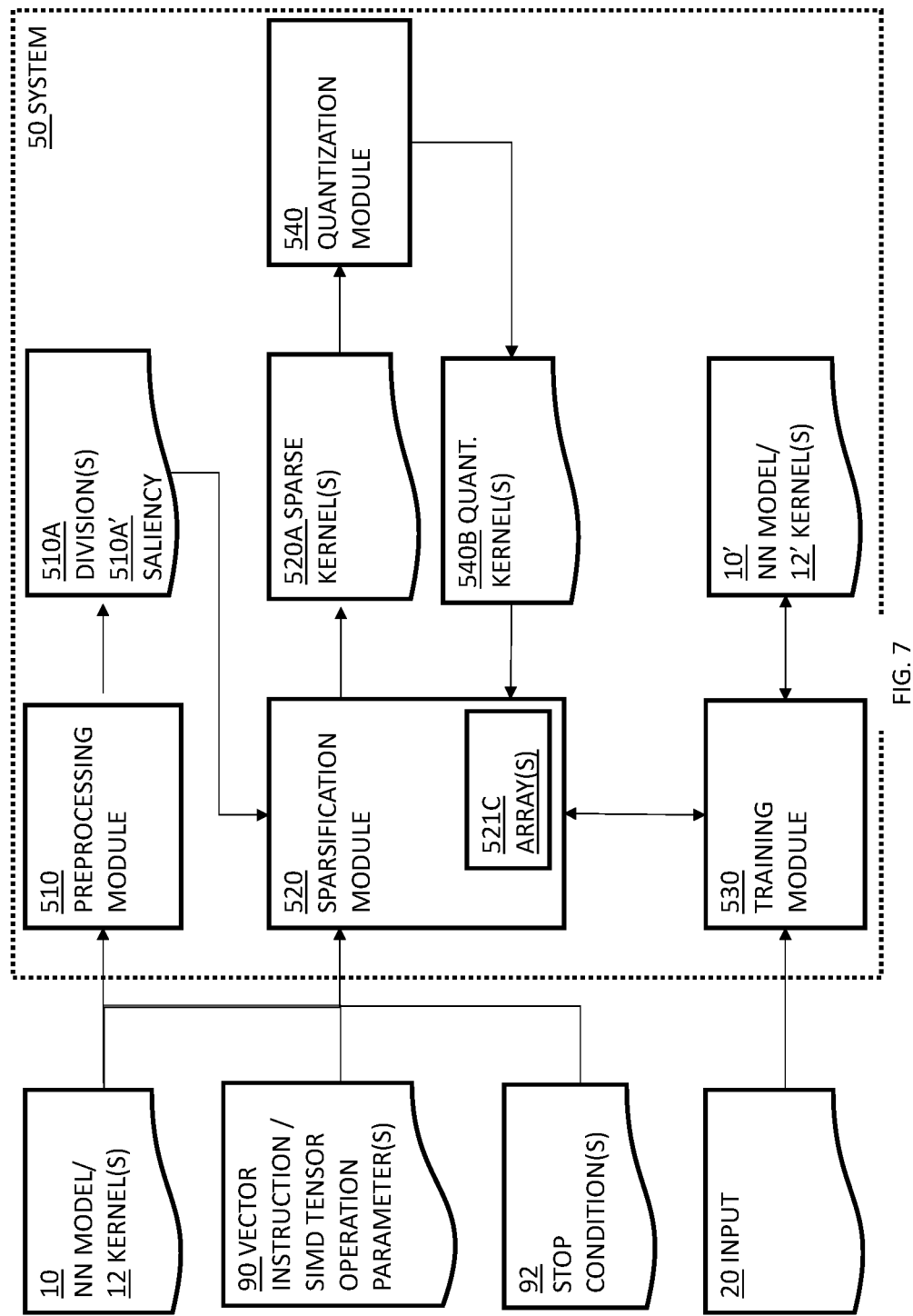
FIG. 7 is a block diagram, depicting a system for accelerating executing of NNs, according to some embodiments of the invention.

Reference is now made to FIG. 7, which is a block diagram, depicting a system for accelerating execution of NNs, according to some embodiments of the invention.

As shown in FIG. 7, system 50 may receive a value of at least one parameter 90 of a vectoral instruction or operation, such as a vectoral operation included in the Intel VNNI instruction set. The at least one vectoral operation parameter 90 may include, for example, an identification of a vectoral operation or instruction (e.g., an FMA instruction included in the Intel VNNI instruction set). The enumeration 90 may therefore be used herein interchangeably, to refer to the relevant vectoral instruction and parameters of the vectoral instruction, according to context.

Additionally the at least one vectoral operation parameter 90 may include one or more of: a first number N1>1, representing a number of indices of one or more input vector registers, a second number N2>1, representing a number of entries in each of the N1 indices, a third number M1 representing a first dimension of the vectoral operation, and/or one or more fourth numbers M2, pertaining to at least one second dimension of the vectoral operation, as elaborated herein (e.g., in relation to FIGS. 5A-5C).

As shown in FIG. 7, system 50 may receive a first kernel matrix 12, representing elements of a kernel of NN model 10 and a second matrix 20, representing elements of an input to kernel 12.

According to some embodiments, system 50 may include a sparsification module 520, adapted to produce, from kernel matrix 12, a group-sparse kernel matrix 12'. As elaborated herein (e.g., in relation to FIG. 5A), group-sparse matrix 12' may include a plurality of arrays 521C. Each array 521C may include a plurality of NN elements, where the dimensions of arrays 521C may be defined by the at least one parameter of the vectoral operation 90.

For example, embodiments of the invention may perform group-pruning of matrix 12, such that the plurality of arrays 521C of matrix 12' may be multidimensional arrays or tensors, including N2 elements, where M1 elements may be aligned along a first indexed axis (e.g., a row, a column, etc., as elaborated in Table 1) of matrix A, and M2 elements may be aligned along corresponding one or more second indexed axes (e.g., rows, columns, etc.) of matrix A. In other words, the number of NN elements N2 in each array 521C of matrix 12' may be a product of the number M1 and the one or more numbers M2 (e.g., N2=M1*M2).

In other words, the shape and size of arrays 521C may be custom-made to match specific characteristics or properties of vectoral instruction 90. Additionally, sparsification module 520 may set the values of all elements of matrix 12' outside the plurality of arrays 521C (e.g., NN elements of matrix 12' that are not included in any of arrays 521C) to null or zero. For example, as elaborated herein in relation to matrix A of FIG. 5A, each array 521C may be a 1D array (e.g. a vector), along a row of matrix A, and may include N2=4 NN elements.

For example, vectoral operation 90 may be an AVX512 VNNI vectoral operation (such as the VPDPBUSD, VPDPBUSDS, VPDPWSSD and/or VPDPWSSDS instruction, as known in the art), and the number of elements in each array 521C may be defined by, or equal to the number of entries in each index of an input vector register used in the AVX512 VNNI vectoral operation (e.g., four 8-bit entries, as depicted in FIG. 5B or two 16-bit entries, as depicted in FIG. 6B).

As elaborated herein (e.g., in relation to FIG. 5A-5C), system 50' may subsequently execute or compute kernel 12' on input 20 by performing at least one iteration or computation of vectoral operation 90 (e.g., the AVX512 VNNI vectoral operation, such as the VPDPBUSD instruction).

The operands of the at least one iteration or computation may include: (a) elements of at least one array 521C of the plurality of arrays 521C; and (b) corresponding elements of the input matrix 20.

The term "corresponding" may be used in this context to refer to operands of a matrix convolution operation, such as two entries pertaining to two input matrices (e.g., input matrix I and kernel matrix A). The operands may "correspond" in a sense that they may be used in a vectoral FMA instruction or vectoral MAC instruction to set a value of a specific position, e.g., the same position, in an output matrix. For example, referring to FIG. 4, element A1,1 of matrix A may be referred to as corresponding to elements [B1,1 . . . B1,16] in relation to setting a value of elements [C1,1 . . . C1,16] in matrix C.

As elaborated herein, in relation to the examples of FIGS. 5A-5C and FIGS. 6A and 6B, system 50 (or 50') may optimally execute vectoral instruction 90 due to the fact that the shape and size of arrays 521C may be custom-made to match the received properties or parameters of vectoral instruction 90.

In other words, embodiments of the disclosed subject matter may include an improvement over currently available systems and methods of NN execution, by adapting the size and shape of arrays 521C, to fit parameters of vectoral instruction 90, group-pruning at least one kernel matrix 12 according to said shape and size and then taking these custom-fit arrays as operands for calculation of the vectoral instruction 90.

According to some embodiments, vectoral instruction 90 may be or may include a Single Instruction Multiple Data (SIMD) tensor operation. In other words vectoral instruction 90 may be adapted to perform parallel computation between respective entries of at least two multidimensional tensors. In such embodiments, sparsification module 520 may be adapted to produce, from kernel matrix 12, a group-sparse kernel matrix 12' as elaborated herein (e.g., in relation to FIG. 5A), Sparse kernel matrix 12' may include a plurality of tensors 521C of NN elements. The number of NN elements in each tensor may be defined by, or equal to the number of entries (e.g., N2) in each index of an input tensor register used in the SIMD tensor operation. All elements of sparse kernel matrix 12' beyond the NN elements included in tensors 521C may be null. System 50' may subsequently execute or compute kernel 12' on input 20 by performing at least one iteration or computation of the SIMD tensor operation (e.g., vectoral instruction 90), having as operands elements a tensor 521C and corresponding elements input matrix 20.

As elaborated herein, the SIMD tensor operation (e.g., vectoral instruction 90) may be, or may include an AVX512 VNNI vectoral operation (such as the VPDPBUSD, VPDPBUSDS, VPDPWSSD and/or VPDPWSSDS instruction, as known in the art).

According to some embodiments of the invention, system 50 may include a preliminary analysis module 510, configured to receive a first (e.g., original) version of an NN model 10 that may include a first (e.g., original) version of at least one kernel matrix. In some embodiments, the original version of the tensor 12 may originate from a previous, or initial (e.g., undisclosed) stage in which NN model 10 was trained. Kernel matrix 12 may for example be a fully-trained, dense kernel matrix or tensor, as commonly referred to in the art. The term "dense" may be used in this context to indicate that kernel tensor 12 may include few or no zero-valued elements.

According to some embodiments of the invention, sparsification module 520 may be adapted to gradually nullify NN elements of at least one NN layer of NN model 10. For example, sparsification module 520 may be adapted to gradually nullify kernel weights or kernel NN elements, complete kernels 12 and/or complete filters from kernel tensor 12 of NN model 10.

According to some embodiments, sparsification module 520 may perform group-pruning of NN elements included in kernel 12, as elaborated herein (e.g., in relation to matrix A of FIG. 5A), and may thus produce at least one second, sparse version of NN model 10, marked as 10'. Sparse version 10' may include at least one sparse version of kernel 12, marked as element 520B.

As explained herein, the set of weights pertaining to each layer (e.g., at each convolutional layer) of the NN may be represented or described as a multidimensional kernel tensor element 12, pertaining to that layer. According to some embodiments, the process of nullifying weights from a neural network may be performed on a layer-by layer basis. For example, weights, kernels and/or filters of kernel tensor element 12, pertaining to a specific layer (e.g., a convolutional layer) of NN model 10 may be nullified via a thresholding procedure, by which all weights or filters that have a norm value below a predefined threshold may be assigned a null value and thus be nullified or eliminated. It may be appreciated that a variety of processes may exist for choosing the threshold value under which weights of the kernel tensor may be pruned. Embodiments of the disclosed subject matter, as elaborated herein, may be independent of any such process for selecting a threshold.

According to some embodiments of the invention, preliminary analysis module 510, may be adapted to receive (e.g., via input device 7 of FIG. 1) at least one vector instruction parameter 90 pertaining to vector instruction, such as a vector instruction 90 of the VNNI instruction set. Preliminary analysis module 510 may divide kernel tensor 12 to a plurality of contiguous blocks or groups of elements or weights according to the one or more vector instruction parameters 90. Preliminary analysis module 510 may produce a division data element 510A, that may include data pertaining to said division, and may include for example a list or a reference to said plurality of contiguous blocks.

For example, in a condition that vector instruction parameters 90 dictate that said vector instruction 90 may be applied on at least one 512 bit input vector, where each input vector may include N1=16 indices, each index including N2=4 entries of 16 bits words (e.g., as depicted in the example of FIG. 5B), then preliminary analysis module 510 may divide kernel matrix 12 to contiguous arrays 521C, each including 4 kernel weights or NN elements each. The term contiguous may be used in this context to indicate that said blocks may represent elements of kernel tensor 12 that may be consecutive in respect to at least one dimension of kernel tensor 12, and/or be read or fetched into a cache memory (e.g., element 9 of FIG. 1) of the executing processor by a single read operation. Division data element 510A may thus include, for example, a data structure (e.g., a list) that may maintain references to kernel tensor weights of each 4-element contiguous array 521C.

Additionally, preprocessing module 510 may calculate, for one or more (e.g., each) array 521C a saliency value 510A' that may be used for selection of one or more arrays 521C, as elaborated herein. Saliency value 510A' may, for example, be a norm value, such as an L1 norm (e.g., commonly referred to as a "Manhattan distance" norm or "taxicab distance") or an L2 norm (e.g., commonly referred to as a "Euclidean" norm) of NN elements of the respective array 521C. It may be appreciated that embodiments of the invention may not be limited to any type of saliency value, and additional saliency values may be used. Division data element 510A may thus include a saliency value 510A' pertaining to each array 521C.

According to some embodiments, the sparsification of NN kernel elements may be performed iteratively, where each iteration may include nullification of NN elements of a portion of arrays 521C, and retraining of kernel 12'.

For example, in a first step of an iteration, preprocessing module 510 may calculate a saliency value 510A' for one or more (e.g., each) array 521C. Sparsification module 520 may then select one or more arrays 521C, corresponding to the lowest saliency values 510A' and set the values of NN elements of the selected one or more elements to null. Sparsification module 520 may nullify the NN elements (e.g., weights) of the at least one selected array, and the selected at least one selected array may subsequently be pruned, in a sense that calculations pertaining to that block (e.g., during training and/or inferring of the NN model) may be skipped or omitted from the overall execution of NN model 10'. Thus, sparsification module 520 may group-prune NN elements of kernel 12 (or 12', in subsequent iterations), to obtain kernel 12'. As elaborated herein (e.g., in relation to matrix A of FIG. 5A), kernel 12' may include a number G of arrays 521C, each including N2 consecutive elements.

In a second step of the iteration, sparsification module 520 may collaborate with a training module 530, adapted to train at least one portion of NN model 10', using input data 20. For example, training module 530 may use at least one instance of input data 20 to retrain pruned kernel 12'.

According to some embodiments of the invention, the first step (e.g., group-pruning) and second step (e.g., retraining) described above may be repeated iteratively, so as to diminish the number G of arrays 521C, until a stop condition 92 is met.

Stop condition 92 may be for example, reaching a predefined number of pruned blocks or a target sparsity ratio (a ratio between the number of zero-valued NN elements, and the total number of NN elements) in group-pruned kernel 12', reaching a predefined level of accuracy of model 10', and/or any combination thereof.

According to some embodiments of the disclosed subject matter, system 50 may include a quantization module 540, adapted to collaborate with sparsification module 520. Quantization module 540 may receive a sparse version 520A of kernel 12 and quantize one or more NN elements or weights of sparse version 520A such that the NN elements would fit entries of vector registers of vector instruction 90. The term "quantize" may refer herein to a process or action of diminishing a representation (e.g., in bits) of an NN element or of a weight of an NN element, or lowering the resolution of the number or the number of bits used to represent the number.

Pertaining to the example of FIG. 5B, where each entry in VREG1 is of an 8-bit representation, quantization module 540 may quantize one or more NN elements or weights of sparse version 520A so as to fit the limitation of the 8-bit representation. For example, during retraining of kernel 12' (e.g., as elaborated herein in relation to training module 530), one or more NN elements of kernel 12' may be modified so as to exceed the 8-bit limitation. Therefore, in each iteration, quantization module 540 may collaborate with sparsification module 520, to represent the one or more NN elements of kernel 12' according to the limitations (e.g., the number of bits in each entry) that are imposed by instruction parameters 90.

Figure 8:
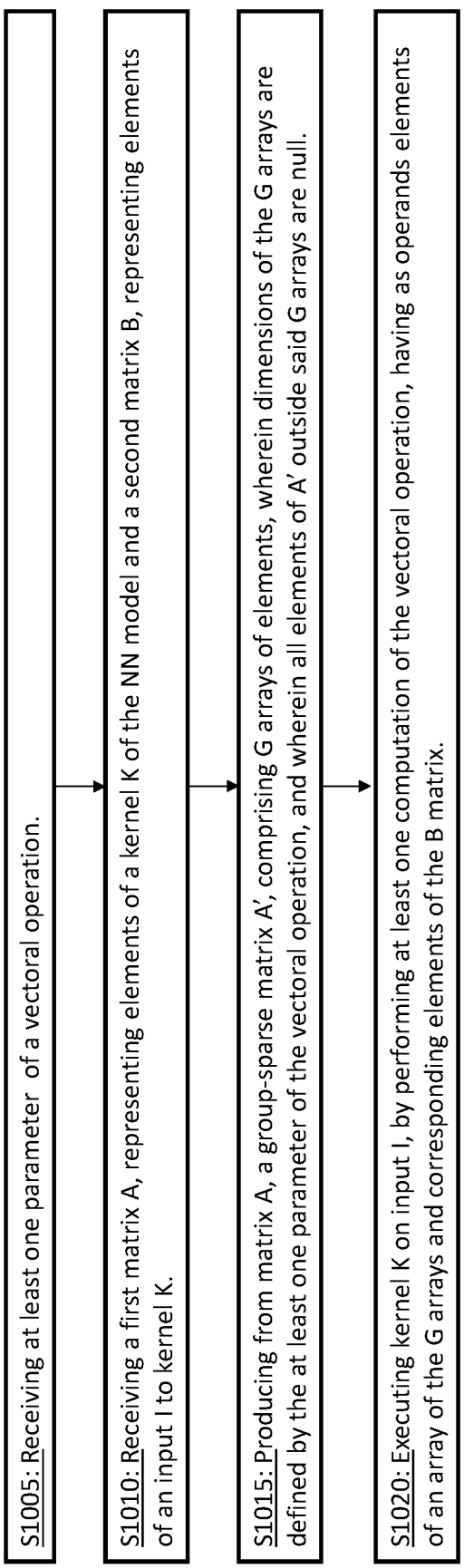
FIG. 8 is a flow diagram, depicting a method of accelerating execution of NNs, according to some embodiments of the invention.

Reference is now made to FIG. 8, which is a flow diagram, depicting a method of accelerating execution of NNs by at least one processor (e.g., element 2 of FIG. 1), according to some embodiments of the invention.

As shown in step S1005, the at least one processor 2 may receive at least one parameter as (e.g., N1, N2, M1 and/or M2) elaborated herein (e.g., in relation to FIGS. 5A, 5B and 5C) of a vectoral operation or instruction (e.g., element 90 of FIG. 7).

As shown in step S1010, the at least one processor 2 may receive a first matrix A (e.g., element 12 of FIG. 7), representing elements of a kernel K of the NN model and a second matrix B (e.g., element 20 of FIG. 7), representing elements of an input I to kernel K.

As shown in step S1015, the at least one processor 2 may produce from matrix A, a group-sparse matrix A' (e.g., element 12' of FIG. 7), including G arrays (e.g., element 521C of FIG. 7) of NN elements, wherein dimensions of the G arrays are defined by, or equal to the at least one parameter of the vectoral operation as elaborated herein (e.g., in relation to FIGS. 5A, 5B and 5C). Additionally, according to some embodiments all elements of A' outside said G arrays may be null or zero.

As shown in step S1020, the at least one processor 2 may execute kernel K on input I, by performing at least one computation or iteration of the vectoral operation 90. The at least one computation or iteration may have, as operands, NN elements of an array 521C of the G arrays and corresponding elements of the B matrix. The term "corresponding" may be used in this context to refer to operands of a matrix convolution operation, such as two entries pertaining to two input matrices (e.g., input matrix I and kernel matrix A). The operands may "correspond" in a sense that they may be used in a vectoral FMA instruction or vectoral MAC instruction to set a value of specific, e.g., the same position in an output matrix. For example, referring back to FIG. 4, element A1,1 of matrix A may be referred to as corresponding to elements [B1,1 ... B1,16] in relation to setting a value of elements [C1,1 ... C1,16] in matrix C.

Figure 9:
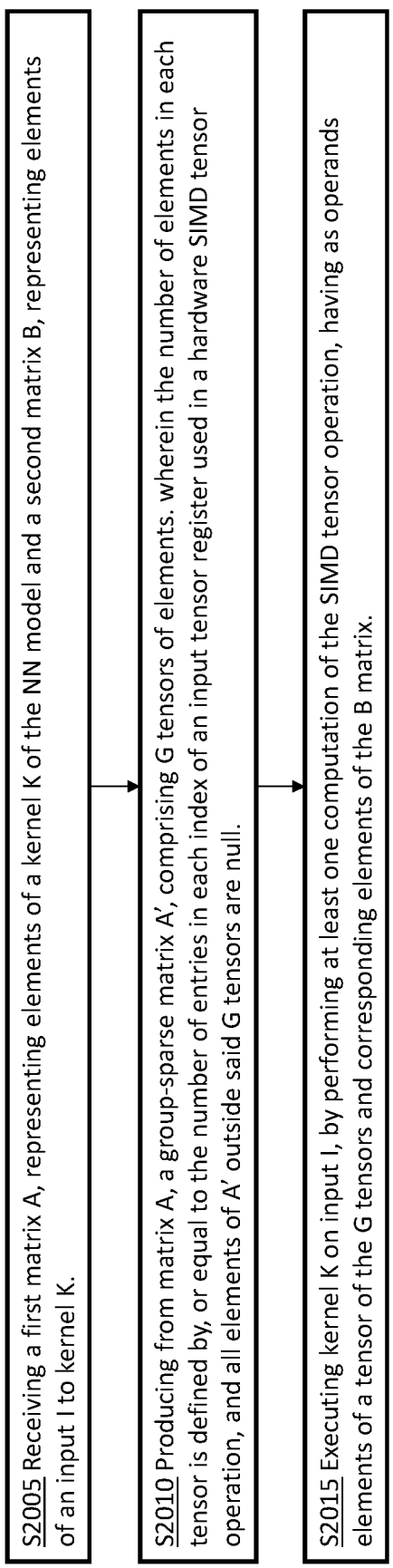
FIG. 9 is a flow diagram, depicting a method of accelerating execution of NNs, according to some embodiments of the invention.

Reference is now made to FIG. 9, which is a flow diagram, depicting a method of accelerating execution of NNs by at least one processor (e.g., element 2 of FIG. 1), according to some embodiments of the invention.

As shown in step S2005, the at least one processor 2 may receive a first matrix A (e.g., element 12 of FIG. 7), representing elements of a kernel K of the NN model and a second matrix B (e.g., element 20 of FIG. 7), representing elements of an input I to kernel K.

As shown in step S2010, the at least one processor 2 may produce, from matrix A, a group-sparse matrix A' (e.g., element 12 and 12' of FIG. 7), including G tensors (e.g., element 12' of FIG. 7) of elements. The number of elements in each tensor may be defined by, or equal to, the number (e.g., N2, as elaborated herein, in relation to FIGS. 5A, 5B, 5C) of entries in each index of an input tensor register used in a hardware SIMD tensor operation (e.g., element 90 of such as an Intel AVX512 VNNI instruction). Additionally, all NN elements of A' outside said G tensors may be set to null or zero.

As shown in step S2015, the at least one processor 2 may execute kernel K on input I, by performing at least one computation or iteration of the SIMD tensor operation 90. The at least one computation or iteration may have, as operands, NN elements of a tensor 521C of the G tensors and corresponding elements of the B matrix.

According to some embodiments of the invention, sparsification module 520 may produce one or more arrays that pertain to more than one layer of NN model 10.

For example, as known in the art, NN model 10 may include a sequence of layers (e.g., layers L1, L2, . . . , Ln) where some are convolution layers, other are pooling layers, etc. The standard order to execute NN 10 may typically be sequential, e.g., one layer after the other, where L1 is run to completion (e.g., all of the L1 outputs are computed), then L2 is run to completion and so on. The problem with this standard layer-by-layer execution is that computation of convolution layers may become memory-bound and therefore, their execution may not fully utilize the processing unit (e.g., element 2 of FIG. 1). This is because the processor may be bottlenecked on the memory system to bring memory chunks from memory (e.g., element 4 of FIG. 1) to the cache memory (e.g., element 9 of FIG. 1).

To solve this problem, embodiments of the invention may use a solution that may be referred herein as a tensor-column solution: instead of computing the full L1 layer output, embodiments of the invention may compute a subset of L1 output that fits into the CPU cache 9, and then immediately use this L1 output subset (which is currently in cache 9) to compute a subset of layer L2 output and so on. As a result, a multi-layer tensor that computes a subset of calculations pertaining to a plurality of layers (e.g., a subset of L1, a subset of L2 and a subset of L3) will have the result residing in the CPU cache, which effectively eliminates the need for the CPU to fetch memory chunks from the memory. This solution may turn the computations pertaining to layers L1, L2 and L3 to become compute-bound, and facilitate full utilization processor 2.

In other words, kernel tensor 12 may include kernel elements pertaining to a plurality of layers of NN model 10. Embodiments of the invention may not be limited by any specific dimension of kernel tensor 12, and may thus produce kernel matrix (or tensor) A' such that arrays 521C may include kernel elements pertaining to a plurality of layers (e.g., L1, L2, L3) of NN model 10. Embodiments of the invention may subsequently accelerate execution of NN model 10 by performing at least one vectoral operation (e.g., an AVX512 VNNI vectoral instruction), as elaborated herein (e.g., in relation to FIG. 5A through 5C).

Embodiments of the invention may include a practical application for executing (e.g., training, testing and/or inference) of NN models on a processing unit.

Embodiments of the invention may include a technological improvement over currently available computer systems and methods for executing NN models by accelerating the NN model execution. As elaborated herein, said acceleration may be obtained by customizing a structure of one or more kernel matrices included in the NN model, based on parameters of given vectoral operations or instructions, and then executing said vectoral operations or instructions on the customized kernels.

A NN can be described by having its weights and inputs represented as matrices, and the computation of the NN represented as a sequence of multiplications of these matrices. Thus, developing fast matrix multiplication algorithms may be key to the performance of NNs. It is also important to consider properties of these matrices that can enable faster matrix multiplication algorithms One such property is sparsity: a matrix is said to be sparse if it contains a lot of entries that are zero or null. During matrix multiplication, if the computations related to the zero elements are never performed, then the overall computation could be reduced if one could branch accordingly: execute the multiplication if the matrix entry is non-zero, or do nothing if it is zero.

This observation, coupled with the high computational cost of executing NNs, such as deep neural networks (DNNs), inspired a very long line of work on reducing computational cost by exploiting the fact that many of the connections (weights) in the neural network kernels can be safely set to zero without adversely affecting the accuracy of the neural network. Generally, these methods can be split into two types.

The first are structured pruning methods, which attempt to eliminate complete components, e.g., entire filters, from the NN. This method has the benefit that the resulting computational savings are easy to materialize: since entire filters are eliminated, all the corresponding multiplications can be skipped. Practically, structured pruning may obtain a "slimmer" neural network with the same accuracy. On the other hand, vast empirical evidence shows that the number of structure units (filters) which can be safely eliminated before significant accuracy loss occurs is quite low (in the 20-40% of filters for most neural networks).

The second set of methods are unstructured pruning methods: they attempt to eliminate individual matrix entries (connections) without enforcing any particular structure. The resulting sparsified models are much harder to leverage for fast computation, however, considerably higher sparsity ratios can be obtained in this way.

Embodiments of the invention may use an approach for sparsifying the weights in neural networks (e.g., a process commonly known as pruning), following a standard pattern. This approach may also be referred to herein as group-pruning. The process may, for example, start with a fully-trained, dense variant of a NN, and may then proceed to gradually remove weights or whole filters from the model, by zeroing them out.

Generally, the process of removing weights from a neural network may be performed at the level of each layer, where the set of weights in each layer can be seen as a multi-dimensional tensor. For instance, removing weights or filters can be performed via a thresholding procedure, by which all weights or filters whose norm falls below a certain value are zeroed out and therefore eliminated. Following the removal of the weights, the model may be re-trained for a limited period of time in order to improve its accuracy, a process known as fine-tuning. Several methods exist for choosing the threshold value under which all weights will be pruned at a step. Embodiments of the invention may be independent of this choice of threshold.

The grouped pruning phase may start from a fully-trained, dense variant of the network, from a group (block) size and shape, and a desired target sparsity ratio for each layer. To achieve this target sparsity ratio, embodiments of the invention may employ an algorithm such as the following example Algorithm 1:

Algorithm 1 a. Let the original network be a fully-trained, dense variant of an NN model that is to be pruned or sparsified, and let T be the target sparsity threshold for each layer.
b. Let S be a fixed number of pruning steps we wish to perform to reach the target sparsity ratio.
c. Initially, the set of pruned weights in each layer is empty.
d. For each training step,
   If is a pruning step, then for each layer do:
   d1. Compute the target sparsity threshold for a layer at a specific step;
   d2. G is the number of extra weight groups which should be thresholded, or pruned in this step in order to reach the threshold;
   d3. Sort the not-yet-pruned groups in descending order by their absolute norm value, resolving ties arbitrarily;
   d4. Remove the bottom G groups from the network, and zero them out; and
   d5. Weights in these groups have value 0 for the forward network pass and are not updated as part of the backward pass; and
e. Perform optimization of the non-marked network weights via backpropagation.

Embodiments of the invention may be seen as a new semi-structured form of NN pruning, in between unstructured and fully structured (channel-wise) pruning, as discussed herein. In fact, one of the key ideas is to adapt the granularity of the pruning procedure to fit the requirements of the hardware supporting efficient execution of quantized models.

Embodiments of the invention may be generic in terms of group shapes, in order to remain flexible with respect to the NN and hardware. For instance, one natural way of creating blocks may include selecting consecutive weight values across the input channel dimension of the CNN kernel. The following description includes examples for exact block structures, but other structures may also be possible.

Embodiments of the invention may choose the block structure so as to efficiently leverage both the benefits of pruning and quantization.

Embodiments of the invention may use properties or parameters of specific vector instructions, such as the Intel AVX512 VNNI vector instructions, to execute NNs that are both (1) quantized and (2) group pruned at the same time. To understand the idea, we first introduce the key challenges in efficiently vectorizing pruned NNs and using VNNI instructions for quantization, and then explain how we solve these problems to provide an efficient vectorized VNNI-based execution for pruned and quantized NNs.

An NN may include of a sequence of layers, where each layer may have its own weights. In a pruned NN, some layers may have sparse or pruned weights. For example, 90% sparse NN convolution layer will have 90% of its weights equal to zero.

Consequently, a sequence of weight values that are continuous in memory may have some locations that are zero and some that are not. Therefore, simply loading these values into a vector register by using a vectorized load (e.g., for AVX512 this may include 16 floating point entries at once), will introduce useless, zero values into the register. To avoid this, zero values may be removed (e.g., by a preprocessing step), which may "packs" the non-zero values together. However, such "packing" may require preserving the original indices of the non-zero values, so that their original locations could be reproduced (e.g., in a similar way to Compressed-Sparse-Row (CSR) techniques). At this point, it may seem that it may be possible to load the packed non-zero values into a vector register and use them, but the problem is that they need to be multiplied with the respective values from the input that are located at the original indices of these non-zero values and this forces an computationally expensive vector gather instruction that would fetch values from various places in memory and aggregate them into one register. It may be appreciated by a person skilled in the art that gather/scatter instructions are to be avoided for efficiency. In other words, it may not be possible to load packed, non-zero weight values into a vector register as they are. As a result, embodiments of the invention may perform efficient vectorization of pruned NNs by multiplying a single non-zero weight value (e.g., a scalar) with a sequence of input values that are continuous in memory. The products of these multiplications may be aggregated into a sequence of distinct output values that may also be continuous in memory.

As known in the art, AVX512 VNNI 8-bit instructions for with arguments VREG3, VREG2, VREG1 (like VPDP-BUSD) may perform a dot product of 4 consecutive 8-bit values from VREG1 with 4 consecutive 8-bit values from VREG2 and store the result into 32 bit accumulator in VREG3 (there are 16 32-bit accumulators in VREG3 for AVX512). In a similar manner, AVX512 VNNI 16-bit instructions with arguments VREG3, VREG2, VREG1 (like VPDPBUSD) may perform a dot product of 2 consecutive 16-bit values from VREG1 with 2 consecutive 16-bit values from VREG2 and store the result into 32 bit accumulator in VREG3. The problem is that this dot product may not be compatible with efficiently vectorizing pruned NNs, where a single weight value scalar is multiplied with a sequence of input values and the results are aggregated to a sequence of distinct output values. In some sense, VNNI instructions were not designed for the pruned NN scenario. However, VNNI internal dot products may be utilized for dense executions, where a sequence of weight values can be simply vector loaded into a vector register. To overcome this issue, embodiments of the invention may include a novel VNNI-friendly semi-structure ML pruning algorithm: Instead of simply pruning NN values as is (e.g., nullifying any value that corresponds to predefined pruning conditions, such as being below a predefined threshold), embodiments of the invention may group-prune NN elements in consecutive groups, arrays or tensors. For example, for AVX512 VNNI 8-bit instructions, embodiments of the invention may group-prune NN kernels in groups of 4 consecutive elements, and for AVX512 VNNI 16-bit instructions, embodiments of the invention may group-prune NN kernels in groups of 2 consecutive elements. Subsequently, embodiments of the invention may combine said group-pruning with efficient vectorization of the VNNI instructions for pruned NNs as elaborated herein.

Embodiments of the invention may perform efficient vectorization of pruned NNs by for example multiplying a single non-zero weight value (e.g., a scalar) with a sequence of input values that are continuous in memory; and aggregating the result into a sequence of distinct output values that are also continuous in memory. For example, the following example algorithm, Algorithm 2 may be applied at the most inner loop hot code-path:

Algorithm 2

1. set all elements of vector register VREG1 to the non-zero weight value V 2. vector load from input memory IN_PTR to vector register VREG2

3. vector load from output memory OUT_PTR to vector register VREG3

4. Execute Fused-multiply-Add instruction that does: VREG3=VREG3+VREG2*VREG1

5. vector store VREG3 back to output memory OUT_PTR

For this code to work properly, a single weight value should be applicable to multiple input and output values that are continuous in memory. To understand how this is done, reference is made to Example convolution 1, elaborating an example of a convolution layer:

Example Convolution 1

1. input size [B, C_in, Z, Y, X], where B is the batch size, C_in is the number of input channels, and Z, Y and X are the spatial dimensions.
2. output size [B, C_out, Z, Y, X], where C_out is the number of output channels, and Z, Y, X are the same sizes as the input via appropriate padding.
3. weight size [C_out, C_in, Kz, Ky, Kx]

In this case, (e.g., ignoring matrix padding) a single weight value K_V at position [n, c, k1, k2, k3] may multiply any input value I_V from the range between [0, c, 0, 0, 0] and [B, c, Z, Y, X]. As a result, K_V can multiply a sequence of input values that are continuous in memory, for example, values over the dimension B or X (if they are big enough).

Embodiments of the invention may modify the ML pruning algorithm so that it has an AVX512 VNNI friendly semi-structure: Instead of simply pruning single NN elements as they are, embodiments of the invention may prune NN elements in groups of 4 values for 8-bit executions, or groups of 2 values for 16 bit executions. For example, consider the following sequence of NN elements (e.g., kernel weight values), elaborated as Examples 1 and 2, below:

Example 1 v1, v2, v3, v4, v5, v6, v7, v8, . . . , vN-6, vN-5, vN-4, vN-3, vN-2, vN-1, vN

It may be appreciated that original ML pruning (e.g., without any structure) may simply set value vK to zero if it corresponds to the conditions of pruning a value (e.g., pruning a kernel weight if it does not surpass a threshold value).

Embodiments of the invention may perform grouped ML pruning, and may see the values as groups of 4 (e.g., for 8-bit VNNI instructions) or groups of 2 (e.g., for 16-bit VNNI instructions). For example, these groups may be formed across any input channel axis (e.g., marked as D1 FIG. 2).

Example 2

[v1, v2, v3, v4], [v5, v6, v7, v8], . . . , [vN-7, vN-6, vN-5, vN-4], [vN-3, vN-2, vN-1, vN]

As shown in Example 3, a group of values (e.g., [v1, v2, v3, v4]) may be regarded as null if all elements included in that group (e.g., v1, v2, v3, and v4) are all zeros. Otherwise the group of values may be regarded as non-zero. (same for groups of 2 for 16-bit executions). Recall that the grouped-pruning algorithm may nullify all these weights in conjunction.

Based on the breakdown of NN element values (e.g., to groups of 4 as shown in Example 3), and the efficient vectorization for pruned NNs as elaborated herein (e.g., in relation to example Algorithm 2), embodiments of the invention may leverage the AVX512 VNNI instructions as elaborated in the example of Algorithm 3, below. It may be appreciated that example Algorithm 3 may be configured to perform the pruning in groups of 4 elements, corresponding to 8-bit quantized values, however other implementations may also be possible. For example, embodiments of the invention may perform group pruning in groups of 2 elements, for 16-bit quantization.

Algorithm 3

For a "non-zero" group of values: v1,v2,v3,v4=V (where V is 32 bit long, and at least one of entry vi (e.g., v1, v2, v3 or v4) is non-zero):
1. set all 32 bit elements of vector register VREG1 to V. (This duplicates V=[v1,v2,v3,v4] to all of the 32-bit positions or indices of input vector register VREG1);
2. vector load from input memory IN_PTR to input vector register VREG2 (This loads 8-bit quantized values into a second input vector register VREG2);
3. vector load from output memory OUT_PTR to vector register VREG3 (This loads 32-bit values to accumulate to into a third vector register VREG3);
4. Execute 8-bit Quantized Fused-multiply-Add instruction (e.g., instruction VPDPBUSD from AVX512 VNNI) that does: VREG3=VREG3+VREG2*quantized multiply*VREG1 (This operation performs a dot product of (v1,v2,v3,v4) with each next 4 consecutive values from the input and aggregates the result to a 32 bit accumulator in VREG3); and
5. vector store VREG3 back to output memory OUT_PTR.

It may be appreciated that the functionality of step 4 (e.g., VNNI fused-multiply add) may be, for example: result_value=result_value+(v1*i1)+(v2*i2)+(v3*i3)+ (v4*i4), where result_value is a 32 bit value and all v and i values are 8-bit values. This means that i1,i2,i3,i4 should in some embodiments contribute to the same output location.

Pertaining to the same convolution layer parameters as elaborated elsewhere herein (e.g., in relation to Example convolution 1), embodiments of the invention may modify the function of the convolution layer as elaborated in the following example, Example convolution 2:

Example Convolution 2

1. weight values of shape=[C_out, C_in, Kz, Ky, Kx] will have C_in as the "least significant or last dimension": consecutive values in memory iterate over C_in;
2. input values of shape=[B, C_in, Z, Y, X] will have C_in as the "least significant or last dimension": consecutive values in memory iterate over C_in;
3. (v1,v2,v3,v4) will be a sequence of 4 consecutive weight values from [C_out, C_in, Kz, Ky, Kx] over the C_in dimension; and
4. (i1,i2,i3,i4) will be a sequence of 4 consecutive input values from [B, C_in, Z, Y, X] over the C_in dimension.

These conditions may ensure that each dot product of step 4 of Algorithm 3 may be done over the C_in dimension, and each dot product result may be aggregated into a different output result.

Pyramid executions may be used to improve the performance on pruned/sparse computations. To understand how, consider a NN that is composed of a sequence of layers L1, L2, . . . , Ln, where some are convolutional layers, some are pooling layers, etc.

The terms "pyramid" and "tensor column" may be used herein interchangeably.

Currently available, standard methods of executing these layers may typically include sequential (e.g., one by one, or layer-by-layer). For example Layer L1 may be run to completion (e.g., when all of the L1 outputs are computed), then L2 may be run to completion and so on. The problem with this standard layer-by-layer execution is that execution of sparse or pruned convolution layers may be memory-bound (e.g., because the computation is reduced significantly by the sparsity), and therefore, their execution cannot fully utilize the CPU compute units. In other words, during execution of sparse layers or kernels the CPU or processing unit (e.g., element 2 of FIG. 1) may be bottlenecked on the memory system to bring cache-lines and/or memory-chunks from a memory device (e.g., element 4 of FIG. 1, such as a DRAM) to the CPU cache (e.g., element 9 of FIG. 1).

To solve this problem, embodiments of the invention may use tensor column or pyramid executions: Instead of computing the full L1 layer output, embodiments of the invention may compute a small subset of L1 output that fits into the CPU cache. For example, a layer-2 cache (not to be confused with layers of the NN model) as known in the art may be 1 MB on a processing unit such as the Intel Skylake). Embodiments of the invention may then use this L1 output subset (which is currently in layer-2 cache) to compute a subset of an output of a second NN model layer, L2, and so on. As a result, a three layer pyramid (for example) that computes a subset of NN model layer L1, a subset of NN model layer L2 and a subset of NN model layer L3 may include the results always residing in the CPU cache memory elements 9. It may be appreciated by a person skilled in the art that this may eliminate the need for the CPU 2 to fetch memory chunks from memory 4. Therefore, the sparse or pruned computations inside NN model layers L1, L2 and L3 may thus become compute-bound (e.g., not storage-bound), such that processor 2 may become able to fully utilize its compute units (for example the two FMA units on Intel Skylake chips).

Embodiments of the invention may apply an algorithm, such as the example algorithm 4 below, to combine pyramid execution with pruned and quantized VNNI execution as elaborated herein (e.g., in relation to Algorithm 3).

Algorithm 4

Phase 1—Generate Pyramids

Breakdown a sequence of layers (e.g., L1, L2, . . . , Lk) to separate tasks called pyramids (e.g., also referred to as tensor columns), such that each pyramid PYR is of the form L1_subset, L2_subset, Lk_subset and has the following properties: (a) PYR can be fully executed by one processing core (e.g., a processing core of processor 2 of FIG. 1); and (b) the outputs generated by PYR fit into a processing unit's core cache (e.g., a layer-2 cache of an Intel CPU).

Phase 2—Run Pyramids

Pyramid PYR can execute on a core (e.g., core C) of the CPU or processing unit 2 with the following conditions:
1. Use Algorithm 3 to execute the pruned and quantized NN.
2. The result of each Li_subset may be a 32 bit value, so it may be quantized before running the next L(i+1)_subset. Since quantization is a local operation (e.g., such that no other outputs of L1 are required) and it is simple math, it is done as is.

3. Sometimes, the result of Li_subset should be fully computed. For example, a convolution should reduce over all CH_in if it is followed by non-linear layer, such as a rectified linear unit (ReLU)) before moving to the next L(i+1)_subset.

4. For inference, only two result buffers may be needed (e.g., B1 and B2) inside the CPU cache, to execute the whole pyramid PYR, because the two result buffers (e.g., B1 and B2) may be swapped when PYR progresses from one Li_subset to the next L(i+1)_subset.

An assumption in Algorithm 4 may be that one can generate pyramids PYR, such that each pyramid PYR's generated output results fit into the CPU cache. However, the NN may be composed of convolutional layers that are followed by non-linear layers (e.g., ReLU layers). This means that in order to progress from Li_subset (that may be a convolution followed by ReLU) to the next step (e.g., the L(i+1)_subset), embodiments may need to compute the output of Li_subset fully. This means that embodiments may need to bring all of the weight values of layer Li to the CPU cache 9. The problem is that weight values of shape=[C_out, C_in, Kz, Ky, Kx] of layer Li may be large to the point where they do not fit into the CPU cache (Layer-2 cache has 1 MB for Intel Skylake). This means that pruned or sparse computations may become memory-bound again.

However, it may be appreciated that weights of Li may be pruned and quantized, and this means that they may take less memory. If, for example, they are pruned to 90%, then they may take approximately a tenth of the memory that may have been consumed by an original (e.g., a dense) version of layer Li. In addition, by quantization to 8-bits, weights of Li may take approximately ¹⁄₄₀ of less memory, and this may be sufficient to satisfy the current modern CPU core cache size (e.g., equal to, or smaller than, 1 Megabyte). In other words, pruning and quantization of weights may enable pyramid or tensor column computation, and in turn pyramids computation may provide compute-bound efficient execution for pruning and quantization, so that the CPU (e.g., processor 2 of FIG. 1) may be fully utilized.

Thus, embodiments of the method presented here can be used to customize the pruning method to specifically optimize computation so that it fits into the cache of the target hardware architecture.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of accelerating execution of a neural network (NN) model, by at least one processor, the method comprising:

receiving at least one parameter of a vector operation, wherein said parameter comprises a number N2>1, representing a number of entries in an index of an input vector register;

receiving a first matrix A, representing elements of a kernel K of the NN model, and a second matrix B, representing elements of an input I to kernel K;

producing from first matrix A, a group-sparse matrix A', comprising G groups of elements, the elements within each group arranged along a row of matrix A, wherein dimensions of the G groups are defined by the at least one parameter of the vector operation, and wherein all elements of A' outside said G groups are null; and executing kernel K on input I, by performing at least one computation of the vector operation, the vector operation having as operands elements of a group of the G groups and corresponding elements of the B matrix;

wherein the vector operation comprises storing N2 elements pertaining to an indexed axis of matrix B in respective entries of an index of an input vector register.

2. The method of claim 1 wherein said at least one parameter comprises a first number N1>1, representing a number of indices of one or more input vector registers and producing group-sparse matrix A' comprises pruning first matrix A, such that the G groups of elements are consecutive along one or more axes of A'.

3. The method of claim 2, wherein the vector operation is a fused multiply accumulate (FMA) operation, and wherein executing kernel K on input I comprises performing at least one FMA computation between N2 elements of a group of the G groups and corresponding elements of the B matrix.

4. The method of claim 3, wherein performing at least one FMA computation comprises:
   a. selecting a first group of the G groups;
   b. broadcasting the N2 elements of the selected group into respective N2 entries of each of the N1 indices of a first input vector register;
   c. wherein storing comprises populating N1*N2 entries of a second input vector register with N1*N2 elements of matrix B;
   d. performing multiplication between elements stored in respective entries of the first input vector register and the second input vector register; and
   e. accumulating the result of said multiplications in corresponding N1 indices of a first output vector register.

5. The method of claim 4, wherein accumulating the result of said multiplications in corresponding N1 indices of a first output vector register is performed such that each index N of the first output vector register comprises a sum of N2 multiplications between entries in the N'th index of the first input vector register and entries in the N'th index of the second input vector register.

6. The method of claim 4, further comprising repeating steps (b) through (e), with a second, subsequent group of the G groups, until all G groups of A' are traversed.

7. The method of claim 6, wherein if the second group resides in the same first indexed axis as the first group then accumulating multiplications pertaining to the second group into indices of the first output vector register, and if otherwise, then accumulating multiplications pertaining to the second group into indices of a second output vector register.

8. The method of claim 3, wherein the G groups are one-dimensional vectors along a first indexed axis, selected from a row and a column of matrix A', and wherein the at least one FMA computation is performed between N2 elements of an group of the G groups and corresponding elements in a second indexed axis, selected from a column and a row of matrix B.

9. The method of claim 8, wherein populating N1*N2 entries comprises:
repeating said storage with a subsequent second indexed axis of matrix B and with a subsequent index of the input vector register, until N1*N2 elements are stored in the input vector register.

10. The method of claim 1, wherein said at least one parameter comprises a first number M1 pertaining to a first dimension of the vector operation, and one or more second number M2, pertaining to at least one second dimension of the vector operation, and wherein the G groups are multi-dimensional groups, comprising M1 elements along a first indexed axis of matrix A' and M2 elements along respective one or more second indexed axes of matrix A'.

11. The method of claim 2, wherein pruning matrix A to receive matrix A' comprises:
pruning elements of kernel K, so as to obtain G groups of N2 consecutive elements;
retraining pruned kernel K based on at least one instance of input I; and
repeating said pruning and retraining steps iteratively, so as to diminish G, until a target sparsification ratio is achieved in pruned kernel K.

12. The method of claim 11, wherein pruning elements of kernel K comprises:
for each group of G, calculating a saliency value;
selecting one or more groups of G, corresponding to the lowest saliency values; and
setting values of elements of the selected one or more groups to null.

13. The method of claim 12, wherein the saliency value is selected from a list consisting of an L1 norm and an L2 norm.

14. A system for accelerating execution of a NN model, the system comprising: a non-transitory memory device, wherein modules of instruction code are stored, and at least one processor associated with the memory device, and configured to execute the modules of instruction code, whereupon execution of said modules of instruction code, the at least one processor is configured to:
receive at least one parameter of a vector operation, wherein said parameter comprises a number N2>1, representing a number of entries in an index of an input vector register;
receive a first matrix A, representing elements of a kernel K of the NN model, and a second matrix B, representing elements of an input I to kernel K;
produce from first matrix A, a group-sparse matrix A', comprising G groups of elements, the elements within each group arranged along a row of matrix A, wherein dimensions of the G groups are defined by the at least one parameter, and wherein all elements of A' outside said G groups are null; and
execute kernel K on input I, by performing at least one computation of the vector operation, the vector operation having as operands elements of a group of the G groups and corresponding elements of the B matrix;
wherein the vector operation comprises storing N2 elements pertaining to an indexed axis of matrix B in respective entries of an index of an input vector register.

15. The system of claim 14 wherein producing group-sparse matrix A' comprises pruning first matrix A, such that the G groups of elements are consecutive along one or more axes of A'.

16. The system of claim 15, wherein the vector operation is a fused multiply accumulate (FMA) operation, and wherein executing kernel K on input I comprises performing at least one FMA computation between N2 elements of a group of the G groups and corresponding elements of the B matrix.

17. The system of claim 16, wherein performing at least one FMA computation comprises:
f. selecting a first group of the G groups;
g. broadcasting the N2 elements of the selected group into respective N2 entries of each of the N1 indices of a first input vector register;
h. wherein storing comprises populating N1*N2 entries of a second input vector register with N1*N2 elements of matrix B;
i. performing multiplication between elements stored in respective entries of the first input vector register and the second input vector register; and
j. accumulating the result of said multiplications in corresponding N1 indices of a first output vector register.

18. A method of accelerating execution of a NN model, by at least one processor, the method comprising:
receiving a first matrix A, representing elements of a kernel K of the NN model and a second matrix B, representing elements of an input I to kernel K;
producing from matrix A, a group-sparse matrix A', comprising G tensors of elements, wherein all elements of A' outside said G tensors are null; and
executing kernel K on input I, by performing at least one computation of a Single Instruction Multiple Data (SIMD) tensor operation performing a dot-multiplication operation, having as operands elements of a tensor of the G tensors and corresponding elements of the B matrix, wherein the tensor operation comprises storing N2 elements pertaining to matrix B in respective entries of an index of an input vector register, N2 representing a number of entries in an index of an input vector register of the tensor operation;
wherein the number of elements in each tensor is defined by the number of entries in each index of an input tensor register used in the hardware SIMD tensor operation and by the number of indices.

19. The method of claim 18, wherein the SIMD tensor operation is an AVX512 VNNI vector operation.

20. A method of accelerating execution of a neural network (NN) model, by at least one processor, the method comprising:
receiving a plurality of parameters of a vector operation, wherein said parameters comprise a first number N1>1, representing a number of indices of one or more input vector registers, and a second number N2>1, representing a number of entries in each of the N1 indices;
receiving a first matrix A, representing elements of a kernel K of the NN model, and a second matrix B, representing elements of an input I to kernel K;
producing from first matrix A, a group-sparse matrix A', comprising G groups of elements the elements within each group arranged along a row of matrix A, wherein dimensions of the G groups are defined by the plurality of parameters of the vector operation, and wherein all elements of A' outside said G groups are null; and
executing kernel K on input I, by performing at least one computation of the vector operation, the vector operation having as operands elements of a group of the G groups and corresponding elements of the B matrix;

wherein the vector operation comprises populating N1*N2 entries of an input vector register with N1*N2 elements of matrix B.

* * * * *